US008461965B2

(12) United States Patent
Chen et al.

(10) Patent No.: US 8,461,965 B2
(45) Date of Patent: Jun. 11, 2013

(54) PORTABLE RADIO FREQUENCY IDENTIFICATION (RFID) READER

(75) Inventors: Ming Chen, Bellevue, WA (US); Fong Shi, Clyde Hill, WA (US); Kenneth G. Voyce, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 727 days.

(21) Appl. No.: 12/686,922

(22) Filed: Jan. 13, 2010

(65) Prior Publication Data

US 2011/0169613 A1    Jul. 14, 2011

(51) Int. Cl.
    *H04Q 5/22*    (2006.01)
(52) U.S. Cl.
    USPC ......... 340/10.1; 340/572.4; 340/8.1; 342/154
(58) Field of Classification Search
    USPC ........................................ 340/10.4, 1.1, 10.1
    See application file for complete search history.

(56) References Cited

U.S. PATENT DOCUMENTS

| | | | |
|---|---|---|---|
| 6,127,981 A | 10/2000 | Pritchett et al. | |
| 6,184,841 B1 | 2/2001 | Shober et al. | |
| 6,476,756 B2 | 11/2002 | Landt | |
| 7,002,641 B2 | 2/2006 | Okuyama et al. | |
| 7,183,922 B2 | 2/2007 | Mendolia et al. | |
| 7,187,288 B2 | 3/2007 | Mendolia et al. | |
| 7,212,116 B2 | 5/2007 | Wang et al | |
| 7,231,355 B2 | 6/2007 | Schoen et al. | |
| 7,450,068 B2 * | 11/2008 | Chen et al. | 342/427 |
| 7,453,363 B2 | 11/2008 | Reynolds | |
| 8,044,797 B2 * | 10/2011 | Brommer et al. | 340/539.32 |
| 2005/0110674 A1 * | 5/2005 | Mendolia et al. | 342/81 |
| 2005/0212660 A1 | 9/2005 | Hansen et al. | |
| 2006/0044147 A1 | 3/2006 | Knox et al. | |
| 2006/0181393 A1 | 8/2006 | Raphaeli | |
| 2006/0255951 A1 | 11/2006 | Roeder et al. | |
| 2006/0279458 A1 | 12/2006 | Mohamadi | |
| 2007/0008071 A1 | 1/2007 | Hansen | |
| 2007/0040687 A1 | 2/2007 | Reynolds | |
| 2007/0176824 A1 | 8/2007 | Stumbo et al. | |
| 2007/0273529 A1 | 11/2007 | Lee et al. | |
| 2007/0282196 A1 | 12/2007 | Birk et al. | |

(Continued)

OTHER PUBLICATIONS

International Search Report and Written Opinion of the International Searching Authority, International Application No. PCT/US2011/020759, European Patent Office, May 17, 2011, (12 pgs).

(Continued)

*Primary Examiner* — Brian Zimmerman
*Assistant Examiner* — Sara Samson
(74) *Attorney, Agent, or Firm* — Toler Law Group, PC

(57) ABSTRACT

A particular portable radio frequency identification (RFID) reader includes an active antenna array including a plurality of antenna elements to receive RFID signals from RFID devices. The antenna elements include control circuitry to control a beam pattern generated by the active antenna array. The portable RFID reader further includes sum circuitry and difference circuitry. The sum circuitry is operable to determine a sum signal by summing the RFID signals received by at least two of the plurality of antenna elements. The difference circuitry is operable to determine a difference signal between the RFID signals received by at least two of the plurality of antenna elements. The portable RFID reader also includes a controller to electronically steer the beam pattern and to determine a direction from the RFID reader to a particular RFID device.

18 Claims, 15 Drawing Sheets

U.S. PATENT DOCUMENTS

2008/0004642 A1* 1/2008 Birk et al. .................... 606/157
2008/0076476 A1 3/2008 Rofougaran
2009/0174557 A1 7/2009 Nlkitin et al.

OTHER PUBLICATIONS

Abbak et al, RFID Coverage Extension Using Microstrip Patch Antenna Array, Electronics Engineering, Sabanci University, Feb. 2009, Istanbul, Turkey.

Karmakar et al., Development of a Low Cost Compact Low Profile Phase Array Antenna for RFID Applications, Smart Sensors and Sensing Technology, Springer-Verlag Berlin 2008.

Preradovic et al., Modern RFID Readers, Electrical and Computer Systems Engineering, Monash University, Sep. 13, 2007.

Leeming, RFID Overview, Intel Corporation, Nov. 8, 2004.

Roberti, Product Developments—RFID 2.0, RFID Journal, Mar./Apr. 2008.

* cited by examiner

US 8,461,965 B2

PORTABLE RADIO FREQUENCY IDENTIFICATION (RFID) READER

FIELD OF THE DISCLOSURE

The present disclosure is generally related to portable radio frequency identification (RFID) readers and methods of using the same.

BACKGROUND

Radio frequency identification (RFID) technology has been used for various tracking and identification purposes, such as inventory control and merchandise tracking. Certain RFID systems use an RFID tag that is powered by a signal from an RFID reader. When powered, the RFID tag may transmit a signal including RFID identification data. The RFID reader may receive the RFID identification data and determine information about the RFID tag or an object associated with the RFID tag based on the identification data.

Identification of individual RFID tags can become difficult where multiple RFID tags respond to the RFID reader's signal. For example, when a plurality of RFID tags are co-located, the RFID reader may have difficulty differentiating responses in a manner that allows the user to select a particular RFID tag that is being searched for. Some RFID readers address this concern by sending rewrite signals rather than simply interrogation signals. That is, these RFID readers send signals that rewrite data on the RFID tags or that reprogram the function of the RFID tags to facilitate differentiating one RFID tag from another. When the RFID tags are to be used by multiple parties for identification purposes, rewriting or reprogramming the RFID tags can be problematic since a subsequent party attempting to read the RFID tags may not be able to read new data written on the RFID tags or may not be able to match the new data to information for tracking purposes.

SUMMARY

Portable radio frequency identification (RFID) readers and methods of use are disclosed. A particular portable RFID reader includes an active antenna array including a plurality of antenna elements to receive RFID signals from one or more RFID devices. Each of the plurality of antenna elements includes control circuitry to control a beam pattern generated by the active antenna array. The portable RFID reader also includes sum circuitry operable to determine a sum signal by summing the RFID signals received by at least two of the plurality of antenna elements. The portable RFID reader further includes difference circuitry coupled to the plurality of antenna elements. The difference circuitry is operable to determine a difference signal between the RFID signals received by at least two of the plurality of antenna elements. The portable RFID reader also includes a controller to electronically steer the beam pattern and to determine a direction from the RFID reader to a particular RFID device of the one or more RFID devices.

Another particular portable RFID reader includes an active antenna array including a plurality of antenna elements to receive RFID signals from one or more RFID devices. The received RFID signals have a characteristic wavelength. The plurality of antenna elements includes at least a first antenna element and a second antenna element. The first antenna element and the second antenna element are spaced apart at a distance of less than one half of the characteristic wavelength. The portable RFID reader also includes circuitry to electronically steer a beam pattern of the active antenna array based on the received RFID signals and to determine a direction of a particular RFID device of the one or more RFID devices.

A method of locating a particular RFID device among a plurality of RFID devices includes sending at least one first RFID interrogation signal from an antenna array of a portable RFID reader. The antenna array includes a plurality of antenna elements. The method also includes receiving a first response signal from a targeted RFID device proximate to the portable RFID reader by at least a first antenna element of the antenna array and by a second antenna element of the antenna array. The method further includes determining a sum signal by summing the first response signal received by the first antenna element and the first response signal received by the second antenna element. The method also includes determining a difference signal by determining a difference between the first response signal received by the first antenna element and the first response signal received by the second antenna element. The method further includes determining a direction from the portable RFID reader to the targeted RFID device based on the sum signal and the difference signal. The method also includes activating an indicator of the portable RFID reader. The indicator indicates the direction to the targeted RFID device.

The features, functions, and advantages that have been described can be achieved independently in various embodiments or may be combined in yet other embodiments, further details of which are disclosed with reference to the following description and drawings.

DETAILED DESCRIPTION

Figure 1:
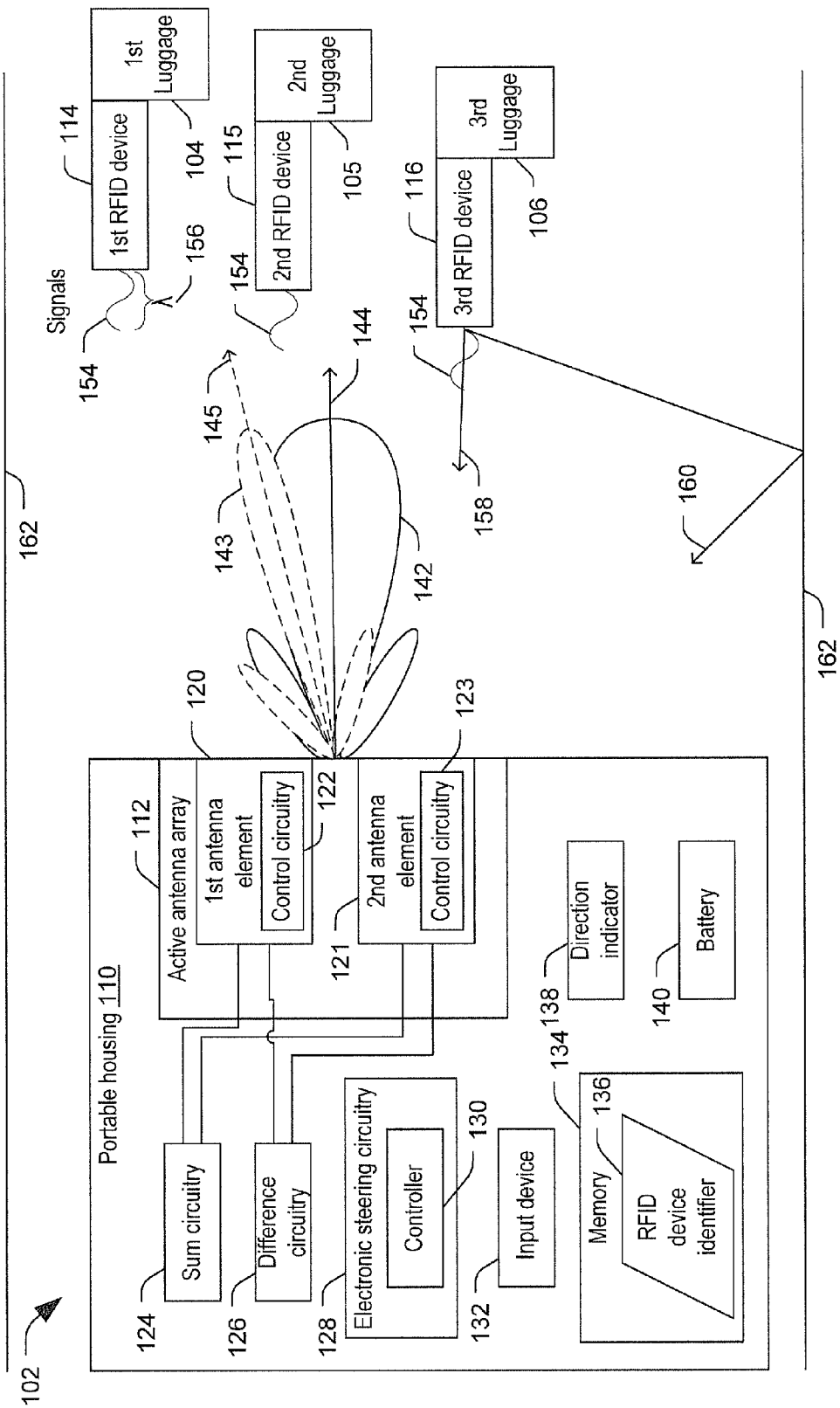
FIG. 1 is a block diagram of a first particular embodiment of a system including a portable RFID reader.

Aviation security has become an increasing concern. One aspect of aviation security that can be expensive and time consuming is matching airline passengers to their luggage. This aspect of aviation security has been particularly emphasized since the bombing of Pan Am Flight 103 near Lockerbie, Scotland in 1988, which has been attributed to a suitcase on board the flight that did not belong to any passenger aboard the aircraft. Many countries now have laws that require that all airlines match passengers on an aircraft to checked luggage on the aircraft to ensure that all luggage on the aircraft is associated with a passenger.

Manually searching for bags that are mismatched with passengers can be impractical in airport operations. For example, the process of manually matching passengers and bags can be labor intensive and may cause flight delays and add additional operational costs to airlines. Radio frequency identification (RFID) technology can store information identifying each bag. The information can be retrieved using an RFID reader. However, rapidly locating individual bags within a cargo hold of an aircraft can be difficult with certain RFID reader technology. Locating individual bags can be especially problematic where a large number of bags are located within a small area (such as a cargo hold) that leads to multipath return signals. In such environments, determining a direction to a particular bag using certain portable handheld RFID readers may be difficult. For example, when it becomes necessary to pull a particular bag from an aircraft that is already prepared for departure due to a passenger associated with the particular bag not boarding the aircraft, airline ground crews may be expected to quickly locate the particular bag to avoid delaying departure of the aircraft. If the bag has already been loaded, the bag may be located in a tight space of the airplane cargo hold along with many other bags from other passengers. If the bag is waiting to be loaded, it may be in a stack along with many other bags. When RFID technology is used, each of the bags may be associated with an RFID tag. Each RFID tag may respond to an RFID reader making it difficult to identify the particular bag.

RFID technology may also be used to facilitate other aircraft operations, such as locating aircraft equipment for maintenance or inspection. However, the problems of identifying the location of a particular RFID tag may extend to these uses as well. For example, certain aircraft equipment may be obscured behind cabinets, in panels, behind seat cushions, etc. When RFID tags are used to track aircraft equipment and the equipment is obscured, locating the aircraft equipment may not be greatly assisted by use of a portable RFID reader since the portable RFID reader may not able to determine a direction to a particular RFID tag.

The present disclosure describes a portable RFID reader that uses an active phased array antenna system. The active phased array antenna system and associated electronics may improve angle sensitivity of the portable RFID reader. By improving angle sensitivity of the portable RFID reader, the disclosed portable RFID reader may enable identifying a particular RFID tag associated with a targeted object even when a direct line-of-sight is not available and when multipath return signals make locating the particular RFID tag difficult. For example, the disclosed portable RFID reader can use the phased array antenna, electronic scanning and adaptive beam forming to track a location of the particular RFID tag using phase information of a difference signal. The phase of the difference signal switches by 180° when an arriving angle of a return signal changes from one side of a pattern null to the other. The phase is easily detected by comparing the phases of the sum and difference signals. Additionally, the phased array antenna electronic scanning may enable discarding multipath return signals so that use of the portable RFID reader in an environment with a large number of multipath return signals is improved. Further, the portable RFID reader may filter out responses from RFID tags that are not being targeted or that are from unexpected directions (e.g., not from a general pointing direction of the portable RFID reader) without rewriting or modifying the RFID tags. Accordingly, the RFID tags can use industry standard RFID technology and data enabling multiple parties to utilize the RFID tags for identification purposes. Thus, use of the portable RFID reader in a confined compartment, such as a cargo container of an aircraft, to locate a particular RFID tag (e.g., an RFID tag associated with luggage of a particular passenger) may be significantly improved. Further, the active phased array antenna system is relatively small, which enables use of the active phased array antenna system for a portable, handheld RFID reader.

FIG. 1 is a block diagram of a first particular embodiment of a system including a portable radio frequency identification (RFID) reader 102. The portable RFID reader 102 is illustrated in an environment where multiple RFID devices 114-116 and multipath return signals 160 are present. For example, the RFID devices 114-116 include a first RFID device 114, a second RFID device 115, and a third RFID device 116. Each of the RFID devices 114-116 may be an RFID tag associated with an item being tracked, such as luggage 104-106 associated with aircraft passengers. The multipath return signals 160 may include signals reflected from walls 162 in the environment where the portable RFID reader 102 is used, such as walls of an aircraft cargo hold.

The portable RFID reader 102 may include a portable housing 110. The portable housing 110 may enable portable, handheld use of the portable RFID reader 102. The portable housing 110 may at least partially enclose a controller 130, a battery 140, a memory 134, sum circuitry 124, difference circuitry 126, one or more other elements of the portable RFID reader 102, or any combination thereof. In a particular embodiment, the battery 140 may provide portable operational power for the portable RFID reader 102.

The portable RFID reader 102 may also include an active antenna array 112. The active antenna array 112 may include a plurality of antenna elements to send RFID interrogation signals and to receive RFID response signals 154 from the RFID devices 114-116. The antenna elements of the active antenna array 112 may include at least a first antenna element 120 and a second antenna element 121. Each of the antenna elements 120-121 may include control circuitry 122-123 to control a beam pattern generated by the active antenna array 112. The control circuitry 122-123 may be controlled by electronic steering circuitry 128. In a particular embodiment, a waveform generated by each of the antenna elements 120-121 is independently controllable using the control circuitry 122-123 to control an overall pattern (e.g., a first interrogation pattern 142) generated by the active antenna array 112. For example, the electronic steering circuitry 128 may include the controller 130 which may send control signals to the control circuitry 122-123. The control signals may cause the control circuitry 122-123 to modify a phase of a waveform generated by at least one of the antenna elements 120-121, to modify an amplitude of the waveform generated by at least one of the antenna elements 120-121, or to modify both the phase and the amplitude of the waveform in order to provide adaptive beam steering of the beam pattern from the active antenna array 112.

The portable RFID reader 102 may also include the sum circuitry 124. The sum circuitry 124 may determine a sum signal by summing the RFID response signals 154 (including the multipath response signals 160) received by the antenna elements 120-121 of the active antenna array 112. The portable RFID reader 102 may also include the difference circuitry 126 coupled to the active antenna array 112. The difference circuitry 126 may be operable to determine a difference signal between the RFID response signals 154 received by one or more of the antenna elements (e.g., the first antenna element 120) and one or more other antenna elements (e.g., the second antenna element 121).

The controller 130 may electronically steer a beam pattern generated by the active antenna array 112 (e.g., a second interrogation pattern 143) based on the sum signal and the difference signal, or both, using the control circuitry 122-123 of each antenna element 120-121. For example, the controller 130 may determine a direction from the portable RFID reader 102 to a particular RFID device of the RFID devices that respond to an interrogation signal. To illustrate, the portable RFID reader 102 may transmit a first interrogation signal via the first interrogation pattern 142. The first interrogation pattern 142 may be relatively broad (i.e., have a relatively wide transmission angle). The first RFID device 114, the second RFID device 115 and the third RFID device 116 may all respond to the first interrogation signal by transmitting response signals 154. However, a user of the portable RFID device 102 may only be looking for the first luggage 104 which is associated with the first RFID device 114. Accordingly, the portable RFID device 102 may access the memory 134. The memory 134 may include an RFID device identifier 136 indicating an identification of a target RFID device, which, in this example, is the first RFID device 114. The controller 130 may determine a direction to the target RFID device, based on the sum signal, the difference signal, or both, and the RFID device identifier 136. Excellent angle resolution is provided by comparing the phases of the sum and difference signals. The phase of the difference signal switches 180° as it crosses a difference pattern null thus providing high angle resolution information.

After determining a direction to the target RFID device, the controller 130 may generate an adaptive beam pattern, such as the second interrogation pattern 143, that is generally directed toward the target RFID device, i.e., the first RFID device 114. For example, the first interrogation pattern 142 may be broad and have a direction 144 that is generally toward the RFID devices 114-116 as a group. To illustrate, the first interrogation pattern 142 may be directed generally along a pointing direction of the portable RFID device 102. After the response signals 154 are received, the portable RFID reader 102 may implement adaptive beam forming to generate the second interrogation pattern 143 which has a direction 145 generally toward the first RFID device 114. Response signals may be received in response to the second interrogation pattern 143 as well. However, since the second interrogation pattern 143 may be narrower than the first interrogation pattern 142 and may be generally directed toward the targeted RFID device, fewer response signals may be received in response to the second interrogation pattern 143. The portable RFID reader 102 may iteratively repeat determining a direction to the targeted RFID device and adaptively forming narrower and more accurately directed interrogation patterns to further refine the direction to the targeted RFID device. In a particular embodiment, the iterative generation of interrogation patterns and determining the direction to the targeted RFID device may be performed by the portable RFID device 102 automatically, in response to an input from the user requesting a direction to the targeted RFID device.

The portable RFID reader 102 may also include the direction indicator 138. The direction indicator 138 may indicate the direction to the targeted RFID device. For example, the direction indicator 138 may include a visual or audible indication that is detectable by the user of the portable RFID device 102 to indicate the direction from the portable RFID device 102 to the targeted RFID device. To illustrate, the direction indicator 138 may include an arrow, a display screen, a light, or another indication that conveys to the user of the portable RFID reader 102 a general direction to the RFID device 114. The direction indicator 138 may indicate an azimuth direction, an elevation direction, or any combination thereof. Additionally, when the portable RFID reader 102 iteratively generates adaptive interrogation patterns and determines the direction to the targeted RFD device, the direction indicator 138 may modify the direction to the targeted RFID device as more accurate information is determined.

The portable RFID device 102 may also include an input device 132. The input device 132 may receive input from the user to identify the particular targeted RFID device. For example, the input may include information stored in the RFID device identifier 136 stored in the memory 134. The input device 132 may also include a trigger or other device to initiate interrogation of the RFID devices 114-116 (e.g., to cause the first interrogation pattern 142 to be sent). The second interrogation pattern 143 and subsequent interrogation patterns may be sent automatically to further refine direction information determined in response to the response signals 154.

The active antenna array 112 may include any number of antenna elements and any arrangement of antenna elements so long as the portable RFID reader 102 remains small enough to be portable and is able to effectively discriminate the direction to the targeted RFID devices. To illustrate the antenna elements 120-121 of the active antenna array 112 may be spaced apart by a distance of less than one half of a characteristic wavelength 156. The characteristic wavelength may be the wavelength 156 of the response signals 154 expected from the RFID devices 114-116. In another example, the characteristic wavelength 156 may be a wavelength of signals transmitted by the active antenna array 112 via the interrogation patterns 142-143. In a particular embodiment, the active antenna array includes more than the two antenna elements 120-121 illustrated in FIG. 1. Various configurations and performance of the antenna elements are described further with reference to FIGS. 2-24.

In a particular embodiment, the active antenna array 112 has a first edge and a second edge that is opposite of the first edge. The antenna elements 120-121 (and any other antenna elements that may be present) reside between the first edge and the second edge. Thus, the first edge and the second edge define boundaries of the active antenna array 112. In a particular embodiment, the edge-to-edge distance between the first edge and the second edge is less than one half the characteristic wavelength 156. In another particular embodiment, a distance between the antenna elements 120-121 is measured center to center, where a center of an antenna element may refer to an effective center or a centroid of the antenna element. The antenna elements 120-121 may be spaced at a distance (i.e., and edge-to-edge distance or a center-to-center distance) less than one half the characteristic wavelength 156. In particular, the distance of two outermost antenna elements may be less than one half the characteristic wavelength, where the outermost antenna elements refer to antenna elements between which the other antenna elements of the active antenna array 112 reside. For example, the distance of the antenna elements 120-121 may be between one half and one fourth of the characteristic wavelength 156. In a particular embodiment, the distance of the antenna elements 120-121 is less than one fourth the characteristic wavelength 156. For example, the distance of the antenna elements 120-121 may be between one fourth and one eighth of the characteristic wavelength 156. In a particular embodiment, the distance of the antenna elements 120-121 is less than one eighth the characteristic wavelength 156. For example, the distance of the antenna elements 120-121 may be between one eighth and one sixteenth of the characteristic wavelength 156. In a particular embodiment, the center-to-center distance of the antenna elements 120-121 is approximately one sixteenth of the characteristic wavelength 156.

In operation, the user of the portable RFID reader 102 may input the RFID device identifier 136 of the targeted. RFID device, for example, the first RFID device 114, using the input device 132. The user may point the portable RFID reader 102 generally toward the RFID devices 114-116 and indicate, using the input device 132, that an interrogation signal is should be sent.

The RFID reader 102 may transmit the first interrogation pattern 142 generally in the pointing direction 144 of the portable RFID reader 102. In response to the first interrogation pattern 142, the RFID devices 114-116 may send the response signals 154. The response signals 154 may be relatively broad, generally directed signals that propagate in many directions, including a direction 158 generally toward the portable RFID reader 102 and in one or more other directions that may generate the multipath return signals 160 (e.g., due to reflections off of the walls 162 or other return signals).

The response signals 154 and the multipath return signals 160 may be received by the antenna elements 120-121. The sum circuitry 124 may determine the sum signal and the difference circuitry 126 may determine the difference signal. The sum and difference signals may be provided to the controller 130. The controller 130 may use the sum and difference signals to determine a general direction toward the targeted RFID device (e.g., the first RFID device 114). The controller 130 may send one or more signals to the control circuitry 122-123 of the antenna elements 120-121 to adaptively form the second interrogation pattern 143, which is generally directed along the direction 145 toward the targeted RFID device. The second interrogation pattern 143 may have a narrower beam width to more finely target the targeted RFID device. Additionally, the controller 130 may provide information to the direction indicator 138 to generate an output to the user indicating the direction to the targeted RFID device. Further, the controller 130 may more finely tune angle discrimination of the active antenna array 112 using the control circuitry 122-123 to reduce processing of return signals received from directions other than the direction 145 toward the targeted RFID device.

The portable RFID reader 102 may iteratively generate additional interrogations patterns to more finely determine the direction to the targeted RFID device, to improve angle discrimination of the received return signals, and to provide additional or better information to the direction indicator to point the user toward the targeted RFID device.

The controller 130 may filter out the return signals that are received at the active antenna array 112 that are not from the targeted RFID device to facilitate determining the direction to the targeted RFID device. For example, when the first RFID device 114 is the targeted RFID device, return signals received from the second RFID device 115 and the third RFID device 116 may be discarded. Additionally, the multipath return signals 160 may be discarded. For example, the controller 130 may filter out return signals received from an unexpected angle (e.g., an angle significantly different than the pointing direction 144 of the portable RFID device 102).

Adaptive beam forming can be used to dynamically adjust angle selectivity or discrimination of the portable RFID reader 102 in a multipath environment by reducing sensitivity to certain directions of signal arrival. For example, the portable RFID reader 102 may use signal processing techniques to null unwanted signals received from any particular direction. Thus, the portable RFID reader 102 may be able to focus on return signals received from the direction of the targeted RFID device. Increased angle discrimination in certain directions can also be useful in searching for the targeted RFID device in the presence of many other RFID devices (such as the second and third RFID devices 115, 116).

For example, for the first interrogation pattern 142, RF energy can be dispersed by the active antenna array 112 across an entire spatial front in a relatively wide beam pattern. Directions of subsequent patterns, such as the second interrogation pattern 143, can be calculated based on angles of arrival, phase and signal strength of the response signals 154, 160 and possibly information identifying the targeted RFID device, such as the RFID device identifier 136. The received return signals 154, 160 from each antenna element 120-121 may be shifted by a unique phase and adjusted by a predetermined weight factor, or a combination of both to improve angle discrimination in the direction of the targeted RFID device.

A controllable beam pattern including a main lobe and possibly one or more nulls and side lobes may be produced by the active antenna array 112. The position and gain of the lobes can be controlled using the control circuitry 122-123. Different patterns can be used each time for the subsequent interrogation patterns until a direction to a targeted RFID device is determined with sufficient certainty or accuracy (e.g., based on a predetermined or adjustable threshold).

Figure 2:
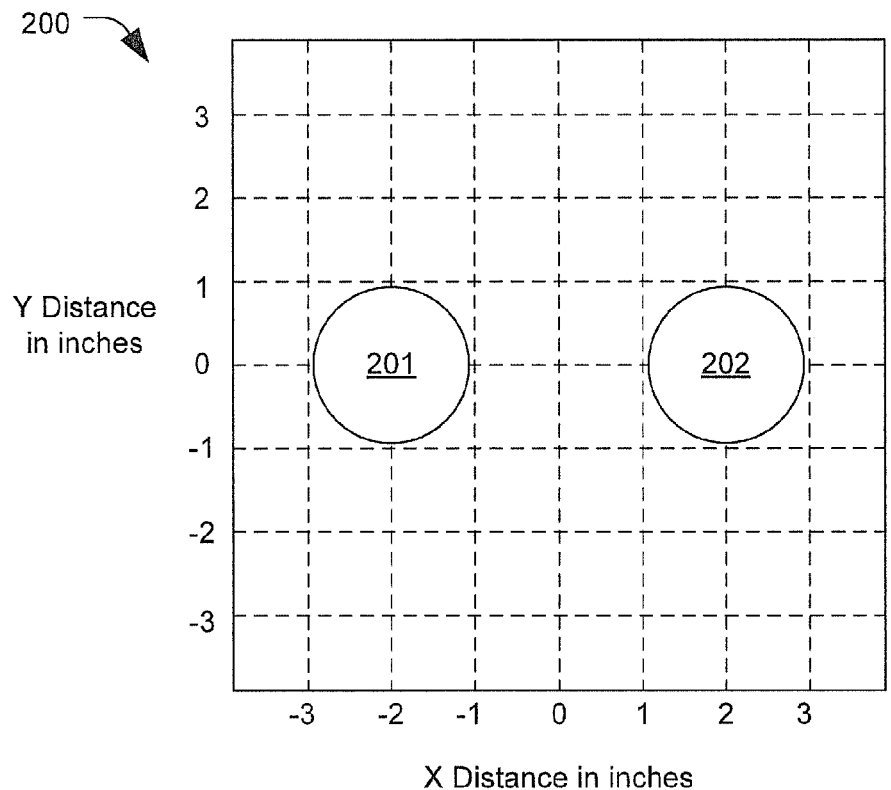
FIG. 2 is an illustration of a first particular embodiment of an antenna array of a portable RFID reader.

FIG. 2 is an illustration of a first particular embodiment of an antenna array 200 of a portable RFID reader, such as the portable RFID reader 102 of FIG. 1. The active antenna array 200 includes a first antenna element 201 and a second antenna element 202. The active antenna array 200 has a spacing measured from center to center of the antenna elements 201 and 202 of approximately four inches. Thus, the active antenna array 200 is small enough to be usable in a portable RFID reader. For certain RFID applications, signals may be sent with a center frequency of about 915 MHz. Taking the speed of light in free space to be approximately $2.9979 \times 10^{10}$ cm/sec, the characteristic wavelength of these signals is about 12.9 inches. Thus, the center-to-center spacing of the antenna elements 201 and 202 illustrated in FIG. 2 is less than one half wavelength (i.e., about 0.31 wavelengths). By determine sum and difference signals based on return signals received by the antenna elements 201 and 202, the antenna array 200 may have sufficient direction discrimination to determine a direction to a targeted RFID device despite the presence of multiple RFID devices and multipath return path signals, as is described further with reference to FIGS. 4 and 5.

Figure 3:
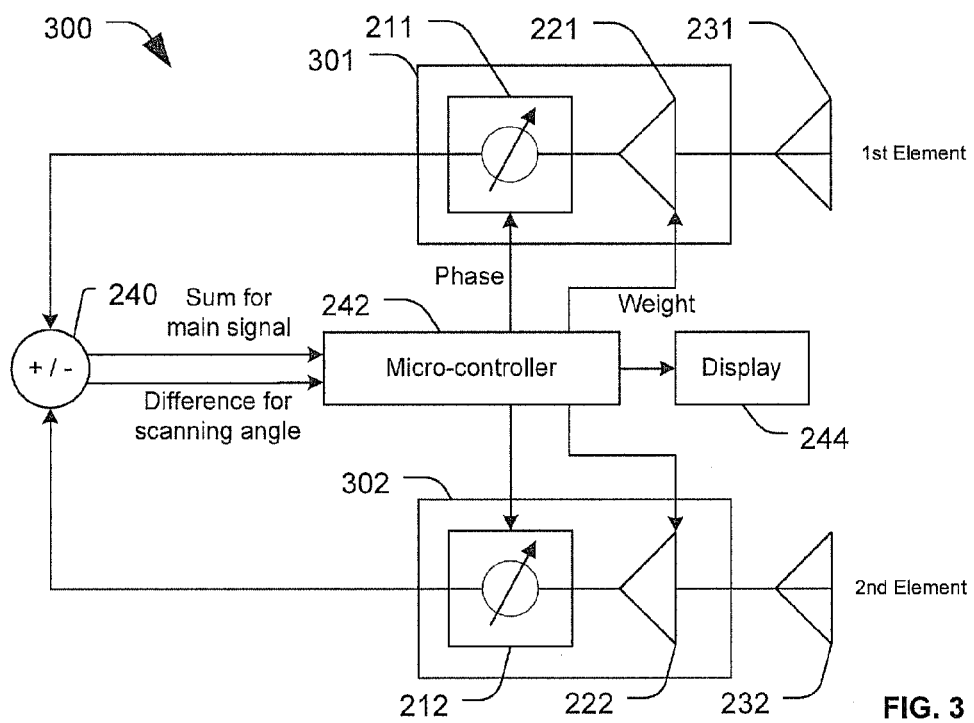
FIG. 3 is a circuit diagram of a first particular embodiment of a portable RFID reader.

FIG. 3 is a circuit diagram of a first particular embodiment of a portable RFID reader 300. The portable RFID reader 300 includes an active antenna array having a first antenna element 301 and a second antenna element 302. For example, the active antenna array may be the active antenna array 200 of FIG. 2. In another example, the active antenna array may have different spacing of the antenna elements 301-302 than the active antenna array 200 of FIG. 2. To illustrate, the active antenna array may be one of the active antenna arrays of FIGS. 17, 19, 21 and 23.

The portable RFID reader 300 also includes sum and difference circuitry 240. The sum and difference circuitry 240 may provide a sum signal and a difference signal to a micro-controller 242. The micro-controller 242 may send complex weight signals to adaptive beam forming control circuitry of each of the antenna elements 301-302. For example, the micro-controller 242 may provide phase signals to phase shifters 211-212 of the antenna elements 301-302. In another example, the micro-controller 242 may provide magnitude signals to low noise amplifiers 221-222 of the antenna elements 301-302. The phase signals and magnitude signals may be used by the antenna elements 301-302 to generate an adaptive beam form that is generated by the antenna array via radiators 231-232. The phase signals and magnitude signals may also or in the alternative be used by the antenna elements 301-302 to tune direction discrimination of the active antenna array. The micro-controller 242 may provide a direction display via the display 244. The direction display may indicate to an operator of the portable RFID reader 300 a direction to a targeted RFID device. The portable RFID reader 300 may also include additional components such as components illustrated in the portable RFID reader 102 of FIG. 1.

Figure 5:
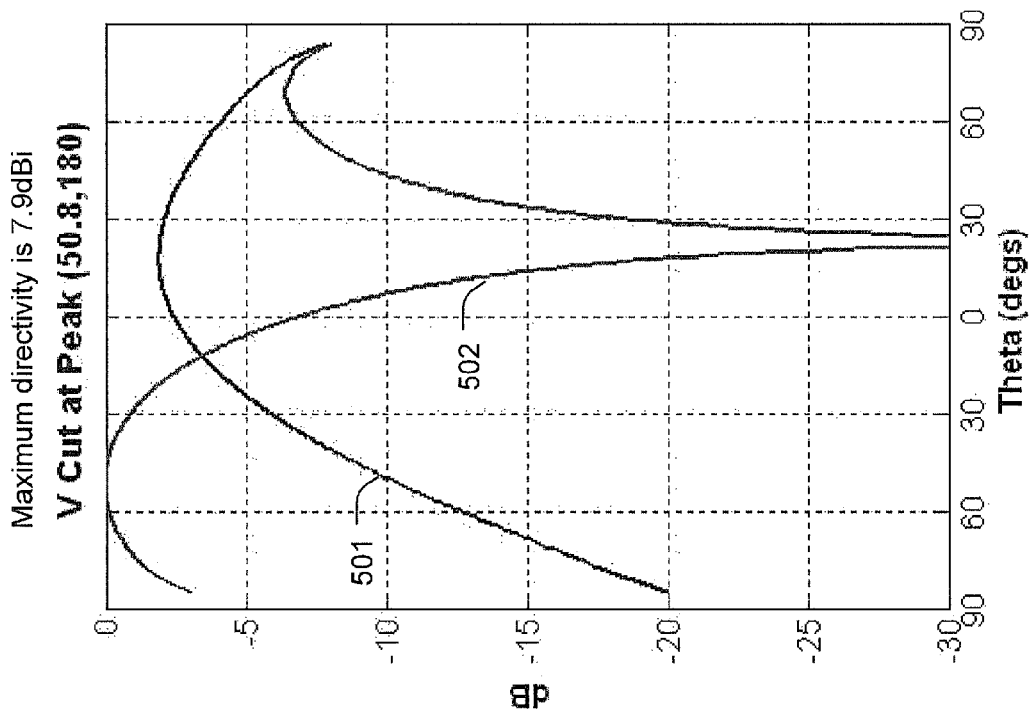
FIGS. 4 and 5 illustrate simulated sum and difference antenna patterns related to the antenna array of FIG. 2.
Figure 4:
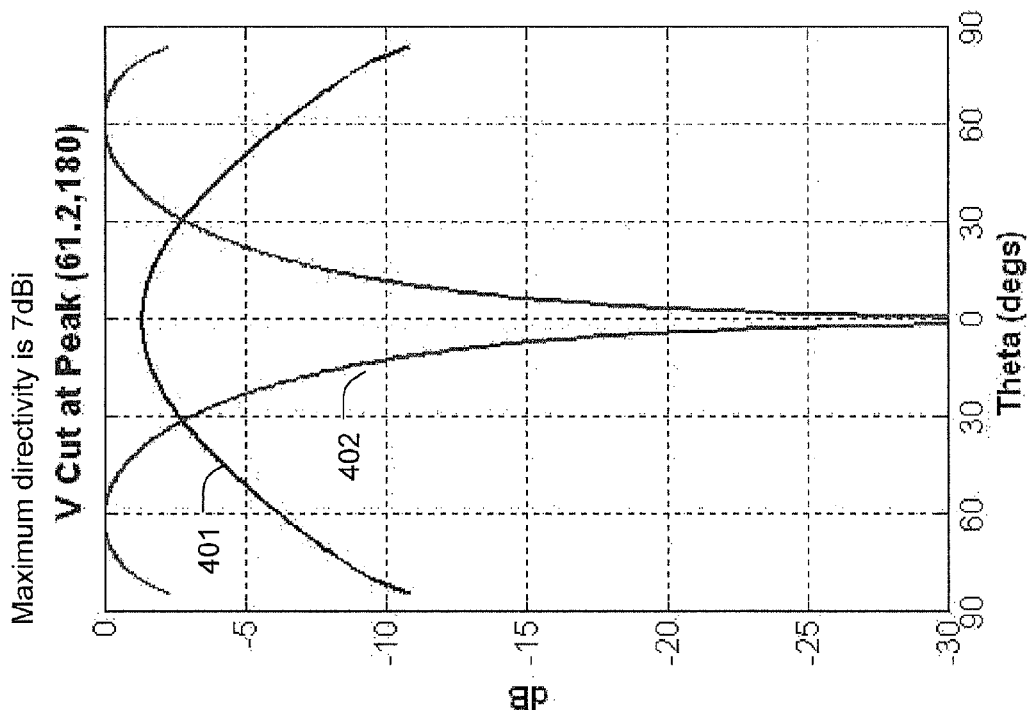

FIGS. 4 and 5 illustrate simulated sum and difference signals related to a two element antenna array. In particular, FIG. 4 illustrates a sum beam pattern 401 and a difference beam pattern 402 for the two element active antenna array 200 of FIG. 2. A sharp null in the difference pattern 402 at Theta=0° indicates excellent sensitivity. For example, at least +/−10° angle selection for RFID reader applications is expected. The sharp null also offers multipath mitigation since it rejects undesirable reflections and allows fewer return signal beams to be processed by the RFID reader.

FIG. 5 illustrates a sum 501 and a difference beam pattern 502 for an adaptive beam formed using the two element antenna array 200 of FIG. 2. The adaptive beams formed by the two element antenna array 200 can be electronically scanned in space, with a scan of about 30-degrees.

Figure 6:
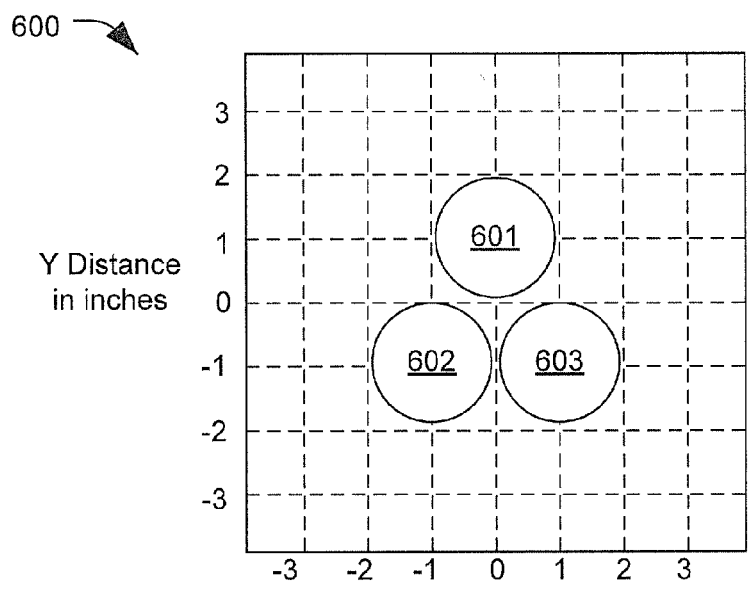
FIG. 6 is an illustration of a second particular embodiment of an antenna array of a portable RFID reader.

FIG. 6 is an illustration of a second particular embodiment of an active antenna array 600 of a portable RFID reader, such as the portable RFID reader 102 of FIG. 1. The active antenna array 600 includes a first antenna element 601, a second antenna element 602 and a third antenna element 603. The active antenna array 600 has spacing along a first axis measured from center to center of the antenna elements 601 and 602 of approximately two inches and spacing along a second axis measured from center to center of the antenna elements 602 and 603 of approximately two inches. In a particular embodiment, the first axis is perpendicular to the second axis. The entire active antenna array 600 covers less than sixteen square inches and is thus small enough to be usable in a portable RFID reader. Additionally, the antenna elements 601-603 are arranged in a non-linear configuration (specifically, a triangular configuration). The non-linear configuration of the antenna elements 601-603 enables determination of directions along two axes, referred to herein as azimuth and elevation. By determining sum and difference signals based on return signals received by the antenna elements 601-603, the antenna array 600 may have sufficient direction discrimination to determine azimuth and elevation directions to a targeted RFID device despite the presence of multiple RFID devices and multipath return path signals.

Figure 7:
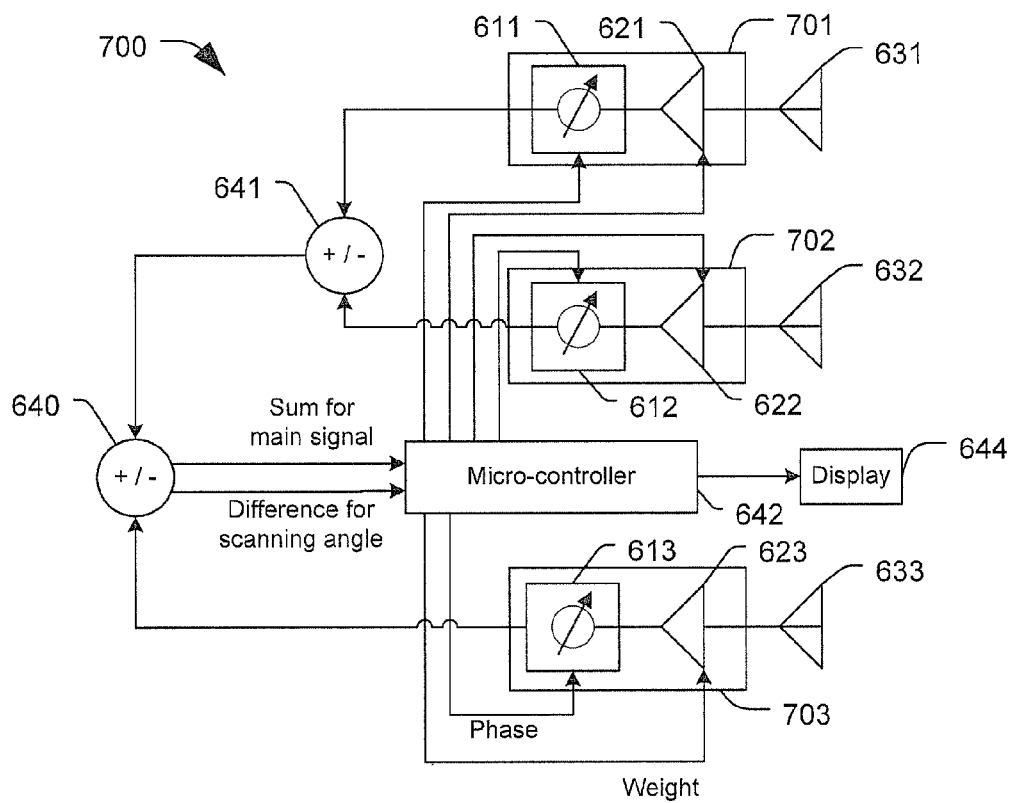
FIG. 7 is a circuit diagram of a second particular embodiment of a portable RFID reader.

FIG. 7 is a circuit diagram of a second particular embodiment of a portable RFID reader 700. The portable RFID reader 700 includes an active antenna array having three antenna elements including a first antenna element 701, a second antenna element 702 and a third antenna element 703. For example, the active antenna array may be the active antenna array 600 of FIG. 6. In another example, the active antenna array may have a different spacing or configuration of the antenna elements 601-603 than the active antenna array 600 of FIG. 6. For example, the antenna elements 701-703 may be arranged linearly or in a different non-linear configuration than the active antenna array 600 of FIG. 6. In another example, spacing, size, or both, of the antenna elements 701-703 may be different than the spacing, size, or both, of the antenna elements 601-603 of FIG. 6.

The portable RFID reader 700 includes sum and difference circuitry 640 and 641. First sum and difference circuitry 641 may determine a sum signal, a difference signal, or both, based on two of the antenna elements, such as the first antenna element 701 and the second antenna element 702. The sum signal, the difference signal, or both, determined by the first sum and difference circuitry 641 may be provided to second sum and difference circuitry 640. The second sum and difference circuitry 640 may provide a sum signal and a difference signal to a micro-controller 642 based on sum and difference signals received from the first sum and difference circuitry 641 and the remaining antenna element, in this case, the third antenna element 703.

The micro-controller 642 may send signals to adaptive beam forming control circuitry of each of the antenna elements 701-703. For example, the micro-controller 642 may provide phase signals to phase shifters 611-613 of the antenna elements 701-703. In another example, the micro-controller 642 may provide weight signals to low noise amplifiers 621-623 of the antenna elements 701-703. The phase signals and weight signals may be used by the antenna elements 701-703 to generate an adaptive beam form that is radiated by the active antenna array via radiators 631-633. The phase signals and weight signals may also or in the alternative be used by the antenna elements 701-703 to tune angle discrimination of the active antenna array. The micro-controller 642 may also provide a direction display via the display 644. The direction display may indicate to an operator of the portable RFID reader 700 a direction to a targeted RFID device. When the antenna elements 701-703 are arranged in a non-linear configuration, the direction display may include direction information along two axes, e.g., an azimuth direction and an elevation direction, to the targeted RFID device. The portable RFID reader 700 may also include additional components such as components illustrated in the portable RFID reader 102 of FIG. 1.

Figure 8:
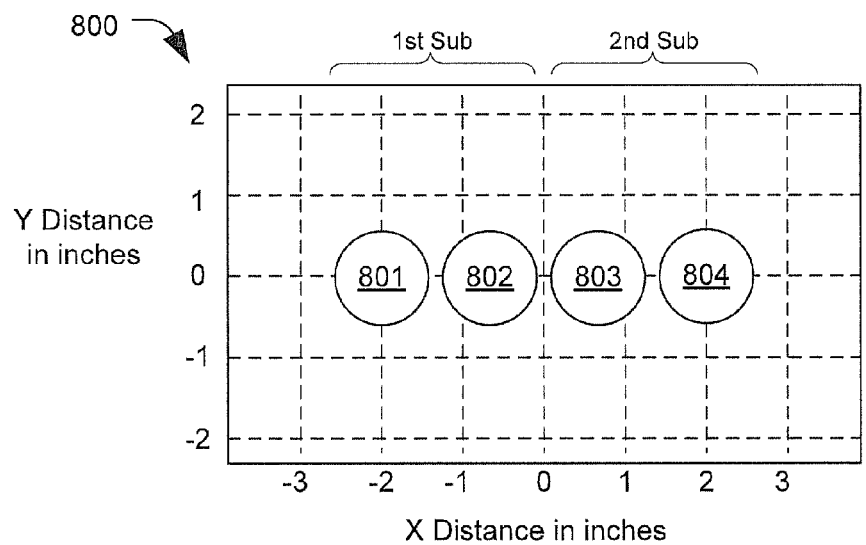
FIG. 8 is an illustration of a third particular embodiment of an antenna array of a portable RFID reader.

FIG. 8 is an illustration of a third particular embodiment of an antenna array 800 of a portable RFID reader, such as the portable RFID reader 102 of FIG. 1. The antenna array 800 includes a first antenna element 801, a second antenna element 802, a third antenna element 803, and a fourth antenna element 804. The antenna array 800 has a spacing measured from center to center of the antenna elements 801 and 804 (the outermost antenna elements) of approximately four inches.

As described with reference to FIG. 2, a characteristic wavelength used by certain RFID technologies is about 12.9 inches. Thus, the center-to-center spacing of the outermost antenna elements 801 and 804 is less than one half wavelength (i.e., about 0.31 wavelengths) and the center-to-center spacing of adjacent antenna elements (such as the first antenna element 801 and the second antenna element 802) is less than about one quarter wavelength. Accordingly, the antenna array 800 may be small enough to be usable in a portable RFID reader. By determining sum and difference signals based on return signals received by the antenna elements 801-804, the antenna array 800 may have sufficient direction discrimination to determine a direction to a targeted RFID device despite the presence of multiple RFID devices and multipath return path signals. Further, the additional antenna elements that are present in the antenna array 800 as compared to the active antenna array 200 of FIG. 2 may provide improved direction discrimination despite the smaller size of the antenna elements 801-804 as compared to the antenna elements 201-202.

In a particular embodiment, when more than two antenna elements are used to form the antenna array, such as in FIG. 8, the antenna elements can be organized into sub-arrays. For example, the first antenna element 801 and the second antenna element 802 may be a first sub-array ("1st Sub") and the third antenna element 803 and the fourth antenna element 804 may be a second sub-array ("2nd Sub"). In another example, the first antenna element 801 and the third antenna element 803 may be the first sub-array and the second antenna element 802 and the fourth antenna element 804 may be the second sub-array. In still another example, the first antenna element 801 and the fourth antenna element 804 may be the first sub-array and the second antenna element 802 and the third antenna element 803 may be the second sub-array. Other configurations of the sub-arrays are also possible. For example, the first sub-array may include three of the antenna elements, such as the first, second and third antenna elements 801-803, and the second sub-array may include only one antenna element, e.g., the fourth antenna element 804. Thus, the groupings of sub-arrays illustrated in FIG. 8 and subsequent figures are illustrative and not limiting.

Figure 9:
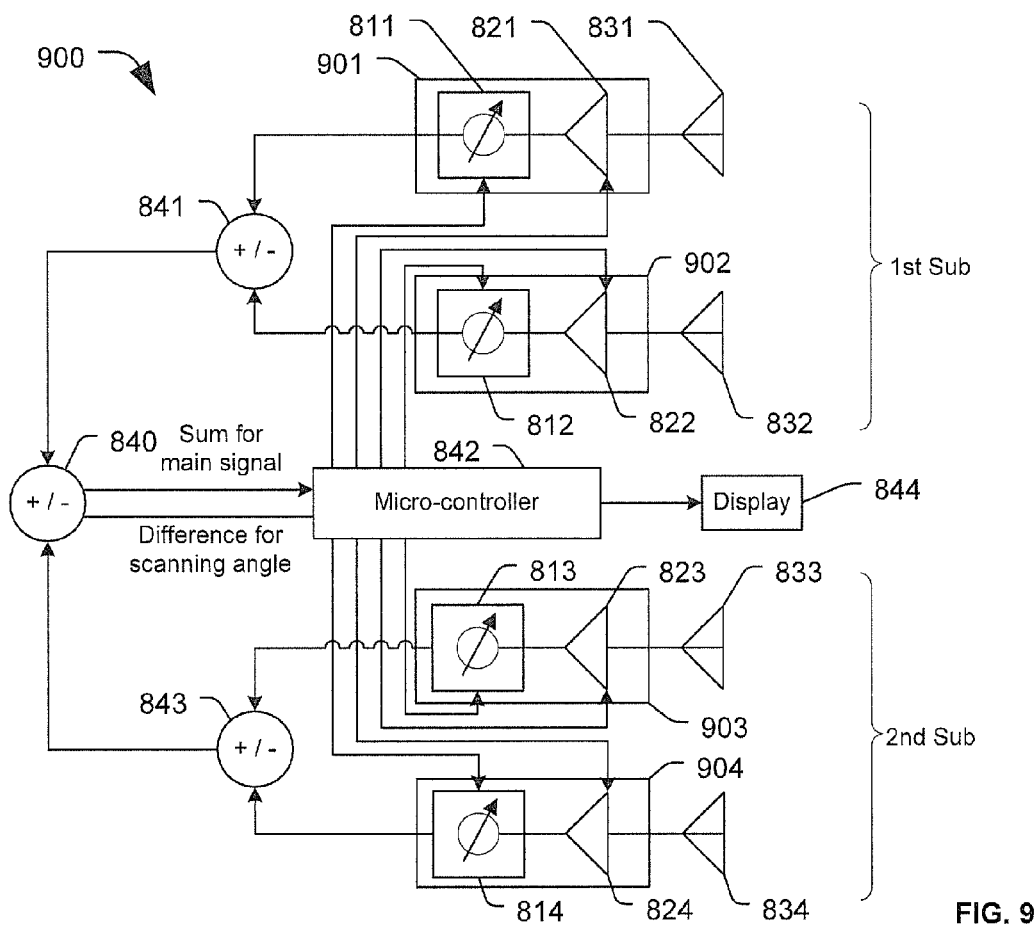
FIG. 9 is a circuit diagram of a third particular embodiment of a portable RFID reader.

FIG. 9 is a circuit diagram of a third particular embodiment of a portable RFID reader 900. The portable RFID reader 900 includes an active antenna array having four antenna elements including a first antenna element 901, a second antenna element 902, a third antenna element 903, and a fourth antenna element 904. For example, the active antenna array may be the active antenna array 800 of FIG. 8. In another example, the active antenna array may have a spacing or configuration of the antenna elements 901-904 that is different than the active antenna array 800 of FIG. 8. For example, the antenna elements 901-904 may be arranged linearly or in a non-linear configuration. In another example, spacing, size, or both, of the antenna elements 901-904 may be different than the spacing, size, or both, of the antenna elements 801-804.

In a particular embodiment, the antenna elements 901-904 are configured into sub-arrays. The portable RFID reader 900 includes first and second sum and difference circuitry 841 and 843. The first and second sum and difference circuitry 841 and 843 may determine sum signals, difference signals, or both based on signals received by antenna elements of each respective sub-array. For example, the first sum and difference circuitry 841 may determine sum and difference signals based on signals received by the first antenna element 901 and the second antenna element 902 to form a first sub-array signal. The second sum and difference circuitry 843 may determine sum and difference signals based on signals received by the third antenna element 903 and the fourth antenna element 904 to form a second sub-array signal. The first sub-array signal and the second sub-array signal may be received at sum and difference circuitry 840. The sum and difference circuitry 840 may generate a sum signal and a difference signal that are provided to a micro-controller 842.

The micro-controller 842 may send signals to adaptive beam forming control circuitry of each of the antenna elements 901-904. For example, the micro-controller 842 may provide phase signals to phase shifters 811-814 of the antenna elements 901-904. In another example, the micro-controller 842 may provide weight signals to low noise amplifiers 821-824 of the antenna elements 901-904. The phase signals, the weight signals, or both, may be used by the antenna elements 901-904 to generate an adaptive beam pattern that is radiated by the antenna array via radiators 831-834. Additionally or in the alternative, the phase signals, the weight signals, or both, may be used by the antenna elements 901-904 to tune angle discrimination of the antenna array.

The micro-controller 842 may also provide a direction display via the display 844. The direction display may indicate to an operator of the portable RFID reader 900 a direction to a targeted RFID device. When the antenna elements 901-904 are arranged in a non-linear configuration, the direction display may include direction information along two axes, e.g., an azimuth direction and an elevation direction, to the targeted RFID device. The portable RFID reader 900 may also include additional components such as components illustrated in the portable RFID reader 102 of FIG. 1.

Figures 10, 11:
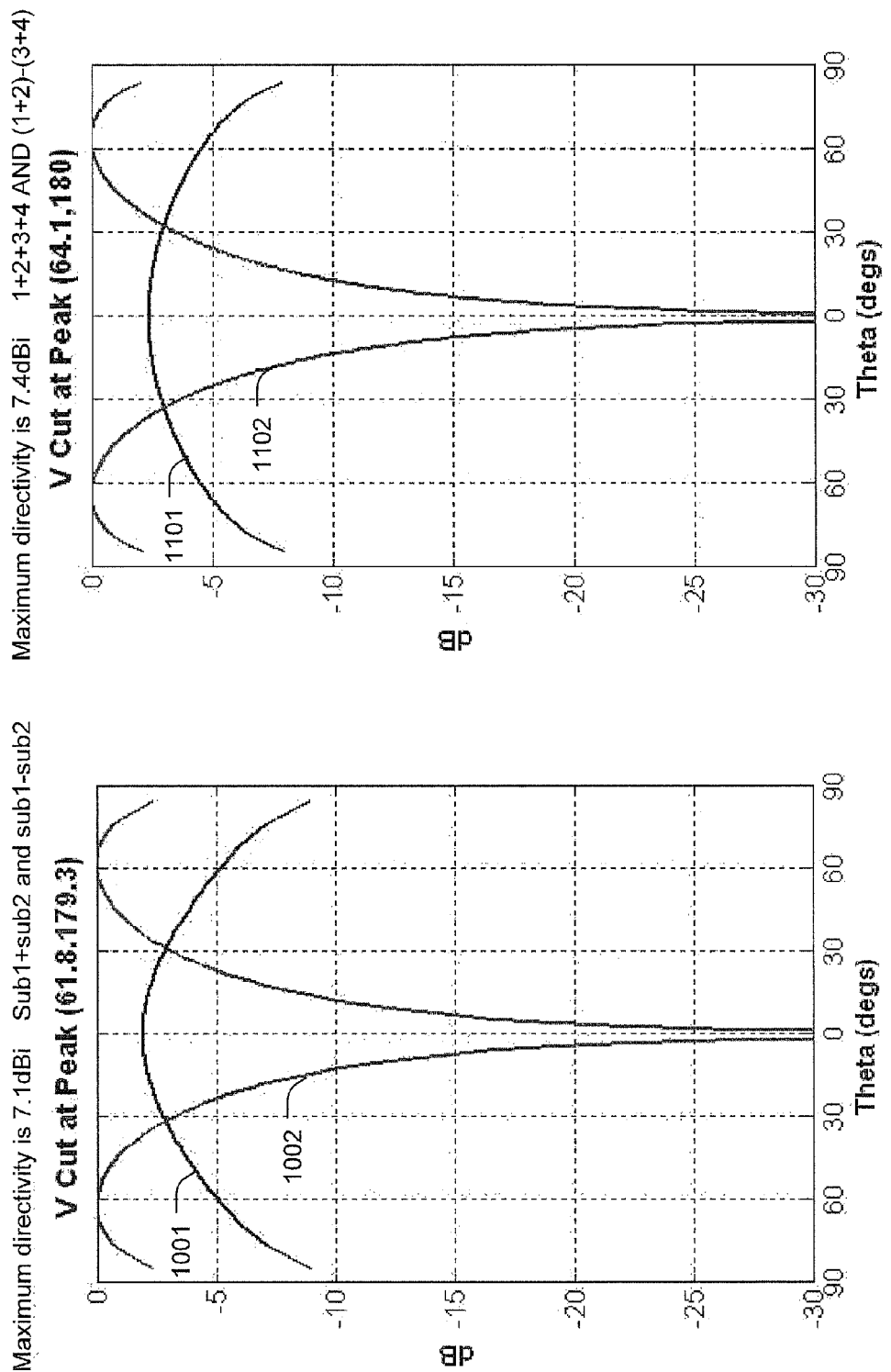
FIGS. 10 and 11 illustrate simulated sum and difference antenna patterns related to the antenna array of FIG. 8.

FIGS. 10 and 11 illustrate simulated sum and difference signals related to a four element antenna array. FIG. 10 illustrates a sum beam pattern 1001 and a difference beam pattern 1002 for the four element active antenna array 800 of FIG. 8 with the antenna elements configured into sub-arrays as indicated in FIG. 8. That is, the first antenna element 801 and the second antenna element 802 form the first sub-array and the third antenna element 803 and the fourth antenna element 804 form the second sub-array. To generate the sum and difference beam patterns 1001 and 1002 of FIG. 10, the antenna elements of each respective sub-array are summed to form sub-array signals. The sum and difference beam patterns 1001 and 1002 are determined based on the sub-array signals. A sharp null in the difference pattern 1002 at Theta=0° indicates improved sensitivity as compared to the difference pattern 402 of FIG. 4. Greater than +/−10° angle selection for RFID reader applications is expected. The sharp null also indicates improved multipath mitigation since undesirable reflections can be rejected and fewer return signal beams may be processed by the portable RFID reader.

FIG. 11 illustrates a sum beam pattern 1101 and a difference beam pattern 1102 for the four element active antenna array 800 of FIG. 8 without the antenna elements configured into sub-arrays. That is, the first, second, third and fourth antenna elements 801-804 are summed to determine the sum signal. The sum of the first and second antenna elements 801-802 is subtracted from the sum of the third and fourth antenna elements 803-804 to determine the difference signal. A sharp null in the difference pattern 1102 at Theta=0° indicates improved sensitivity as compared to the difference pattern 402 of FIG. 4. Greater than +/−10° angle selection for RFID reader applications is expected. The sharp null also indicates improved multipath mitigation.

Figure 12:
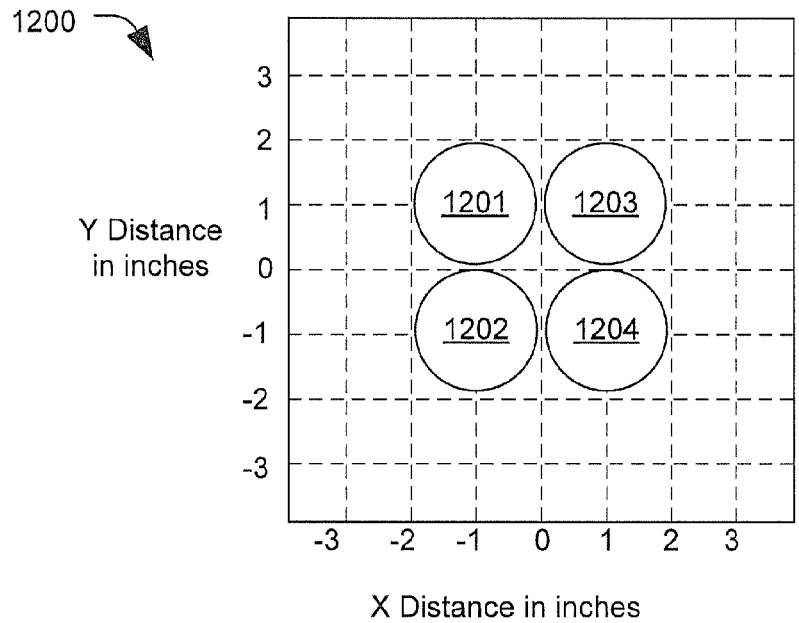
FIG. 12 is an illustration of a fourth particular embodiment of an antenna array of a portable RFID reader.

FIG. 12 is an illustration of a fourth particular embodiment of an antenna array 1200 of a portable RFID reader, such as the portable RFID reader 102 of FIG. 1. The active antenna array 1200 includes a first antenna element 1201, a second antenna element 1202, a third antenna element 1203, and a fourth antenna element 1204 arranged in a non-linear (e.g., square or rectangular) configuration. The active antenna array 1200 has spacing along a first axis measured from center to center of the first antenna elements 1201 and the third antenna element 1203 of approximately two inches and spacing along a second axis measured from center to center of the first antenna element 1201 and the second antenna element 1202 of approximately two inches. The first axis and the second axis may be perpendicular to one another. As explained with reference to FIG. 2, a characteristic wavelength used by certain RFID technologies is about 12.9 inches. Thus, the center-to-center spacing of the antenna elements 801-804 is about one sixth wavelength (i.e., about 0.15 wavelengths) along both axes. Additionally, with edge dimensions of less than about four inches by four inches, the active antenna array 1200 is small enough to be usable in a portable RFID reader. By determining sum and difference signals based on return signals received by the antenna elements 1201-1204, the antenna array 1200 may have sufficient direction discrimination to determine a direction to a targeted RFID device despite the presence of multiple RFID devices and multipath return path signals. Further, the additional antenna elements that are present in the active antenna array 1200 as compared to the active antenna array 200 of FIG. 2 may provide improved direction discrimination. Further, since the antenna elements 1201-1204 are arranged in a non-linear configuration, the antenna array may provide direction discrimination in two axes, e.g., an azimuth axis and an elevation axis.

In a particular embodiment, the antenna elements 1201-1204 can be organized into sub-arrays. For example, the first antenna element 1201 and the second antenna element 1202 may be a first sub-array, and the third antenna element 1203 and the fourth antenna element 1204 may be a second sub-array. In another example, the first antenna element 1201 and the third antenna element 1203 may be the first sub-array, and the second antenna element 1202 and the fourth antenna element 1204 may be the second sub-array. In still another example, the first antenna element 1201 and the fourth antenna element 1204 may be the first sub-array, and the second antenna element 1202 and the third antenna element 1203 may be the second sub-array. Other sub-array configurations are also possible. For example, three of the antenna elements may form the first sub-array and one of the antenna elements may form the second sub-array. Similarly, one or more of the antenna elements may be included in more than one sub-array. For example, the first sub-array may include the first, second and third antenna elements 1201, 1202 and 1203, and the second sub-array may include the second, third and fourth antenna elements 1202, 1203 and 1204. Further, more than two sub-arrays may be used. For example, the first sub-array may include the first, third and fourth antenna elements 1201, 1203 and 1204; the second sub-array may include the second, third and fourth antenna elements 1202, 1203 and 1204; a third sub-array may include the first, second and fourth antenna elements 1201, 1202 and 1204, and a fourth sub-array may include the first, second and third antenna elements 1201, 1202 and 1203. Likewise, various groups of two antenna elements may be organized into sub-arrays with some or all of the antenna elements 1201-1204 being used for more than one sub-array.

Figure 13:
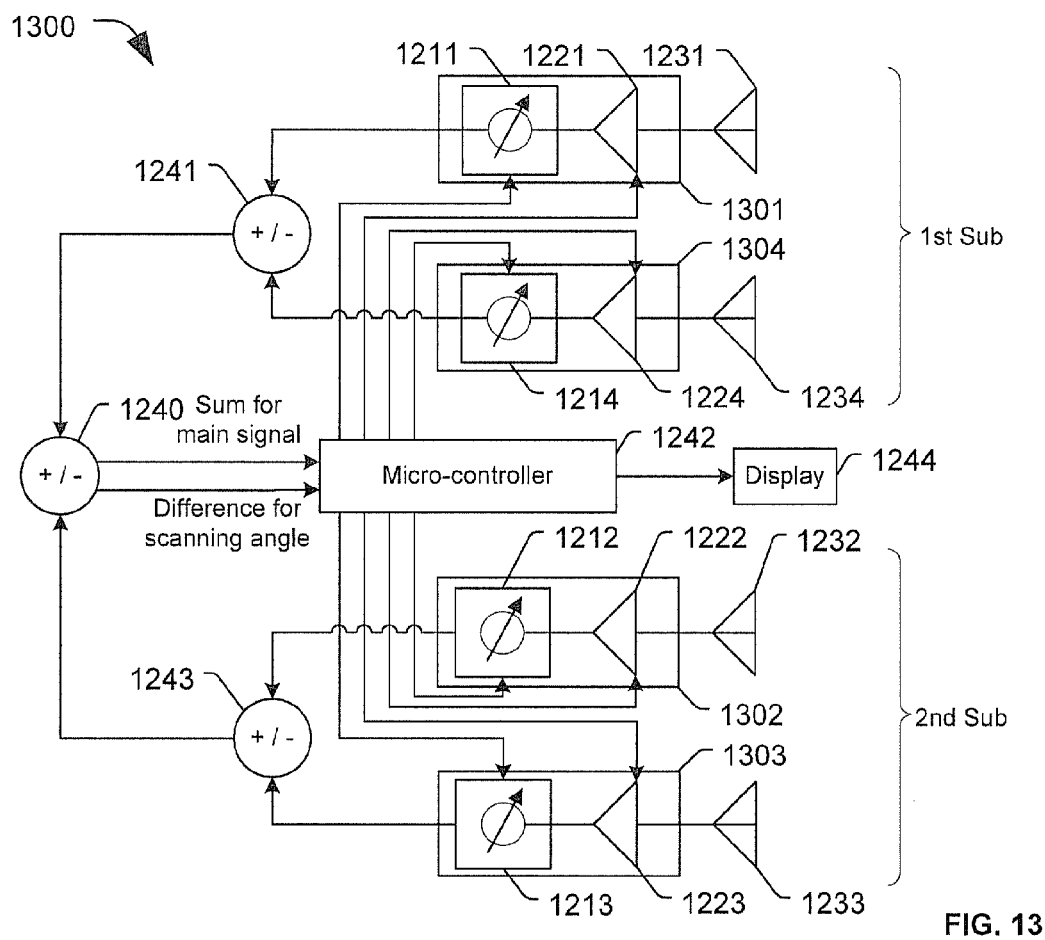
FIG. 13 is a circuit diagram of a fourth particular embodiment of a portable RFID reader.

FIG. 13 is a circuit diagram of a fourth particular embodiment of a portable RFID reader 1300. The portable RFID reader 1300 includes an active antenna array having four antenna elements including a first antenna element 1301, a second antenna element 1302, a third antenna element 1303, and a fourth antenna element 1304. For example, the active antenna array may be the active antenna array 1200 of FIG. 12. In another example, the active antenna array may have spacing, size or configuration of the antenna elements 1301-1304 that is different than the active antenna array 1200 of FIG. 12. For example, the antenna elements 1301-1304 may be arranged linearly or in a different non-linear configuration.

In a particular embodiment, the antenna elements 1301-1304 are configured into sub-arrays. The portable RFID reader 1300 includes first and second sum and difference circuitry 1241 and 1243. The first and second sum and difference circuitry 1241 and 1243 may determine sum signals, difference signals, or both, based on response signals received by antenna elements of each respective sub-array. For example, the first sum and difference circuitry 1241 may determine sum and difference signals based on response signals received by the first antenna element 1301 and the fourth antenna element 1304 to form a first sub-array signal. The second sum and difference circuitry 1243 may determine sum and difference signals based on response signals received by the second antenna element 1302 and the third antenna element 1303 to form a second sub-array signal. The first sub-array signal and the second sub-array signal may be received at sum and difference circuitry 1240. The sum and difference circuitry 1240 may generate a sum signal and a difference signal that are provided to a micro-controller 1242.

The micro-controller 1242 may send signals to adaptive beam forming control circuitry of each of the antenna elements 1301-1304. For example, the micro-controller 1242 may provide phase signals to phase shifters 1211-1214 of the antenna elements 1301-1304. In another example, the micro-controller 1242 may provide weight signals to low noise amplifiers 1221-1224 of the antenna elements 1301-1304. The phase signals, the weight signals, or both, may be used by the antenna elements 1301-1304 to generate an adaptive beam pattern that is radiated by the antenna array via radiators 1231-1234. Additionally or in the alternative, the phase signals, the weight signals, or both, may be used by the antenna elements 1301-1304 to tune angle discrimination of the antenna array.

The micro-controller 1242 may also provide a direction display via the display 1244. The direction display may indicate to an operator of the portable RFID reader 1300 a direction to a targeted RFID device. When the antenna elements 1301-1304 are arranged in a non-linear configuration, the direction display may include direction information along two axes, e.g., an azimuth direction and an elevation direction, to the targeted RFID device. The portable RFID reader 1300 may also include additional components such as components illustrated in the portable RFID reader 102 of FIG. 1.

Figure 14:
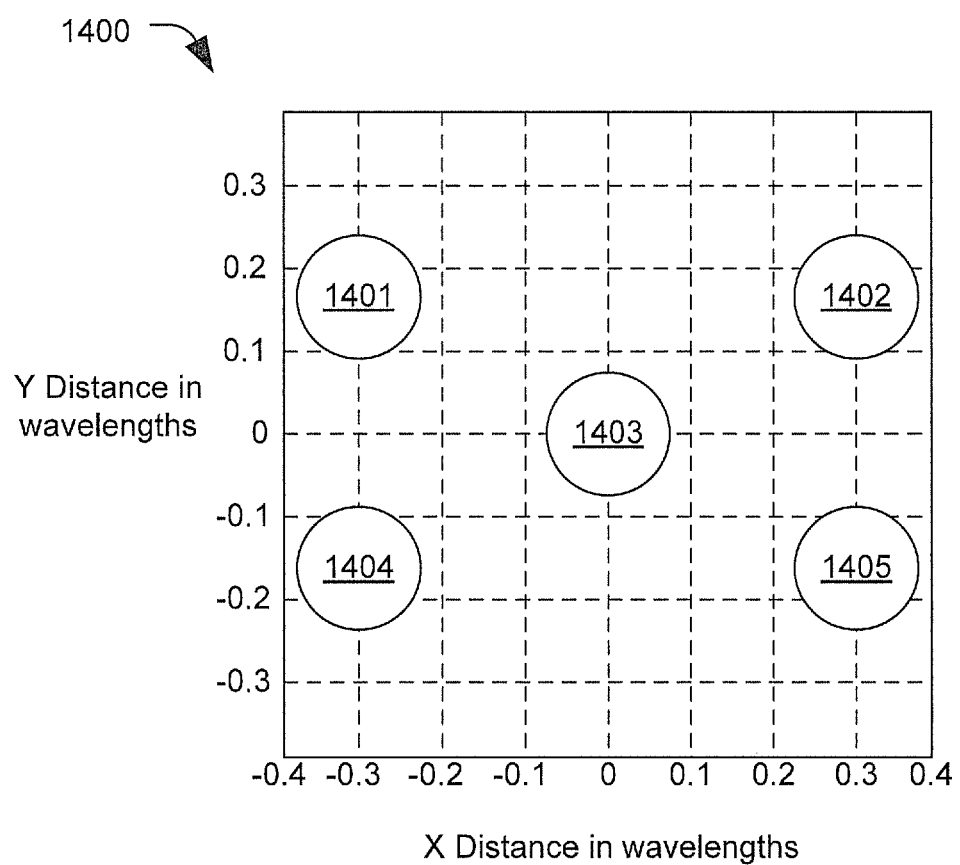
FIG. 14 is an illustration of a fifth particular embodiment of an antenna array of a portable RFID reader.

FIG. 14 is an illustration of a fifth particular embodiment of an antenna array 1400 of a portable RFID reader, such as the portable RFID reader 102 of FIG. 1. The antenna array 1400 includes a first antenna element 1401, a second antenna element 1402, a third antenna element 1403, a fourth antenna element 1404 and a fifth antenna element 1405 arranged in a non-linear (e.g., rectangular or bow-tie) configuration. The antenna array 1400 has a spacing along a first axis measured from center to center of the first antenna elements 1401 and the second antenna element 1402 of approximately 0.6 wavelengths and spacing along a second axis measured from center to center of the first antenna element 1401 and the fourth antenna element 1404 of approximately 0.35 wavelengths. As explained with reference to FIG. 2, a characteristic wavelength used by certain RFID technologies is about 12.9 inches. Thus, the center-to-center spacing along the first axis is about 7.75 inches and the spacing along the second axis is about 1 inch. Accordingly, the active antenna array 1400 is small enough to be usable in a portable RFID reader.

By determining sum and difference signals based on return signals received by the antenna elements 1401-1405, the antenna array 1400 may have sufficient direction discrimination to determine a direction to a targeted RFID device despite the presence of multiple RFID devices and multipath return path signals. Further, the additional antenna elements that are present in the active antenna array 1400 as compared to the active antenna array 200 of FIG. 2 may provide improved direction discrimination. Further, since the antenna elements 1401-1405 are arranged in a non-linear configuration, the antenna array may provide direction discrimination in two axes, e.g., along an azimuth axis and along an elevation axis.

Additionally, as described above, the antenna elements 1401-1405 may be used to form sub-arrays. For example, groups of two, three or four of the antenna elements 1401-1405 may be configured into sub-arrays. Some or all of the antenna elements 1401-1405 may be included in more than one sub-array.

Figure 16:
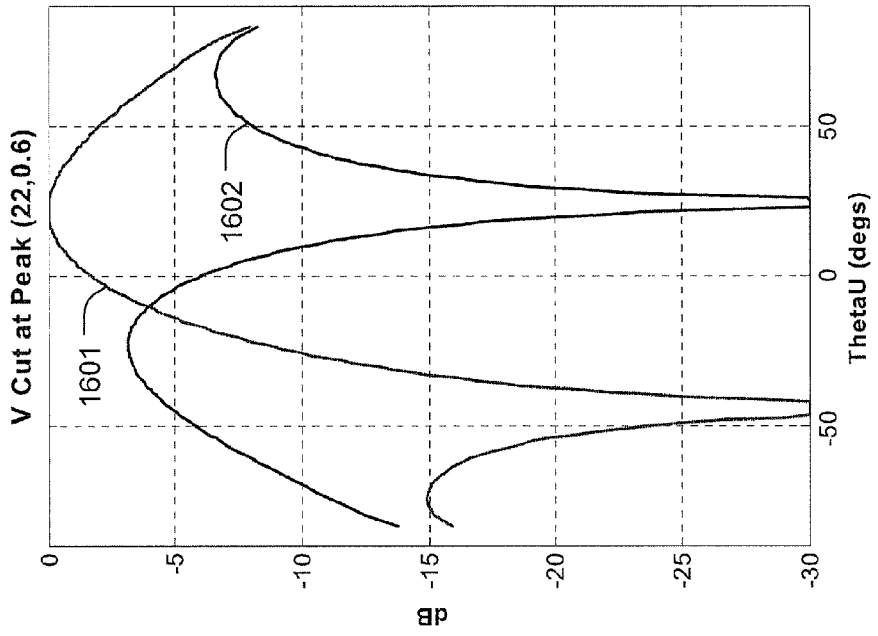
FIGS. 15 and 16 illustrate simulated sum and difference antenna patterns related to the antenna array of FIG. 14.
Figure 15:
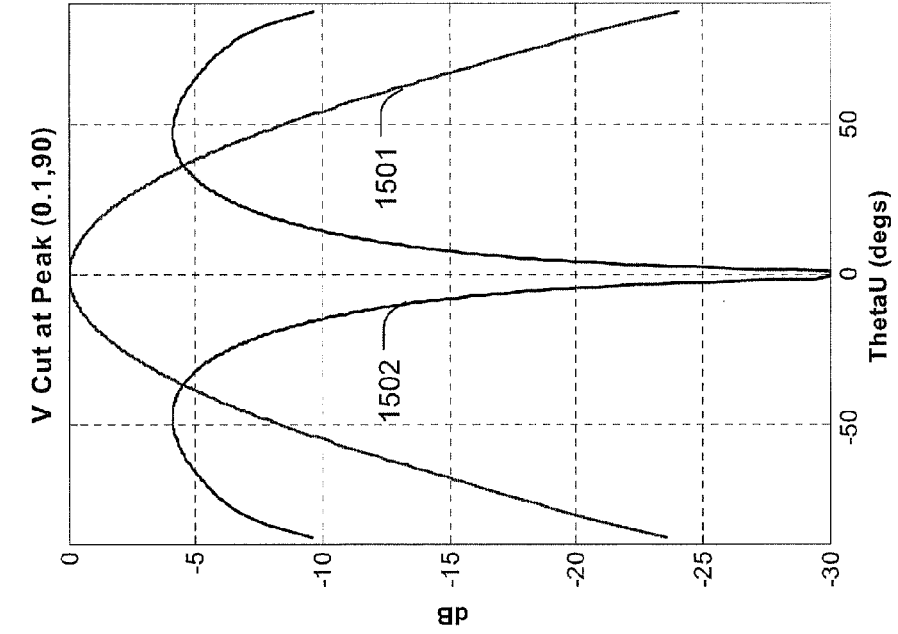

FIGS. 15 and 16 illustrate simulated sum and difference signals related to the antenna array 1400 of FIG. 14. In particular, FIG. 15 illustrates a sum beam pattern 1501 and a difference beam pattern 1502 for the bow-tie shaped active antenna array 1400 of FIG. 14. A sharp null in the difference pattern 1502 at Theta=0° indicates excellent sensitivity. For example, at least +/−10° angle selection for RFID reader applications is expected. The sharp null also indicates multipath mitigation since undesirable reflections are rejected and fewer return signal beams may be processed by the portable RFID reader.

FIG. 16 illustrates a sum 1601 and a difference 1602 beam pattern for an adaptive beam formed using the bow-tie active antenna array 1400 of FIG. 14. The adaptive beams formed by the bow-tie active antenna array 1400 can be electronically scanned in space, with a scan angle of greater than 30-degrees from the center.

FIGS. 17, 19, 21 and 23 illustrate embodiments of two element antenna arrays with various spacings. FIGS. 18, 20, 22 and 24 illustrate simulated sum and difference signals related to the two element antenna arrays of FIGS. 17, 19, 21 and 23, respectively.

Figure 17:
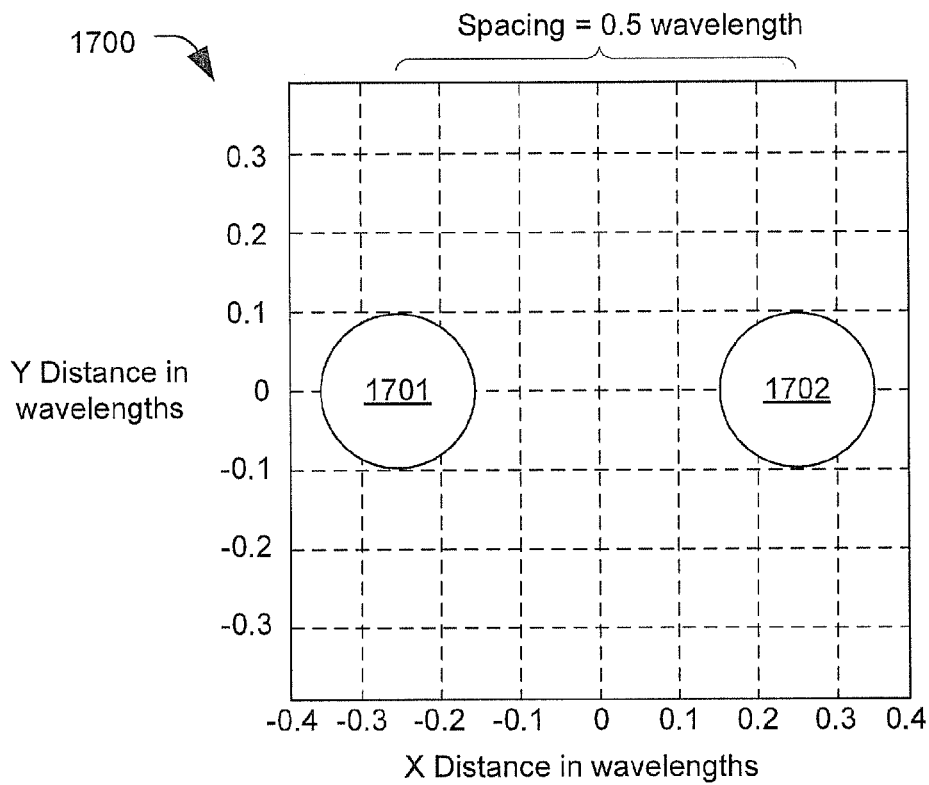
FIG. 17 is an illustration of a sixth particular embodiment of an antenna array of a portable RFID reader.
Figure 18:
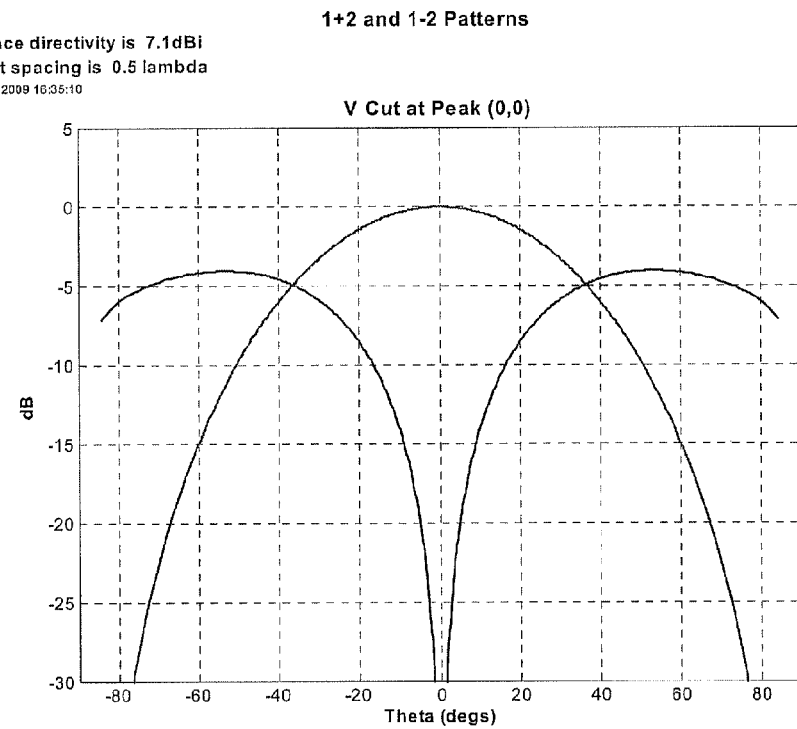
FIG. 18 illustrates simulated sum and difference antenna patterns related to the antenna array of FIG. 17.

FIG. 17 is an illustration of a sixth particular embodiment of an antenna array 1700 of a portable RFID reader having spacing of about 0.5 wavelengths center to center of antenna elements 1701 and 1702. FIG. 18 illustrates simulated sum and difference signals related to the antenna array 1700 of FIG. 17 and illustrates that at one half wavelength spacing of the antenna elements 1701 and 1702 the antenna array 1700 has good sensitivity and angle selection.

Figure 19:
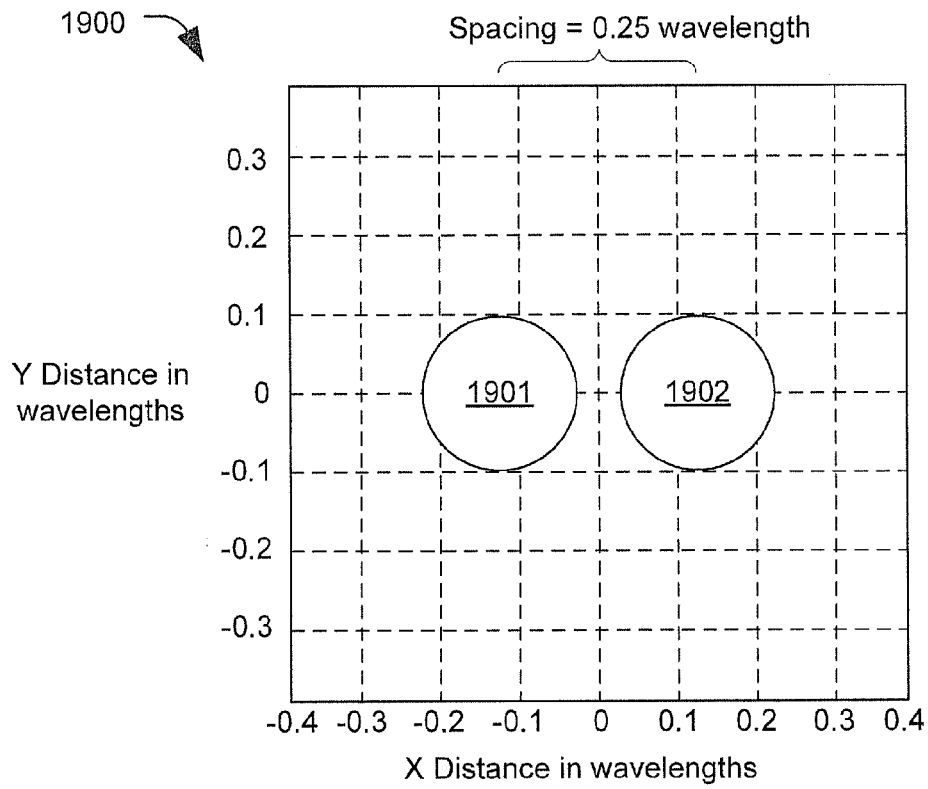
FIG. 19 is an illustration of a seventh particular embodiment of an antenna array of a portable RFID reader.
Figure 20:
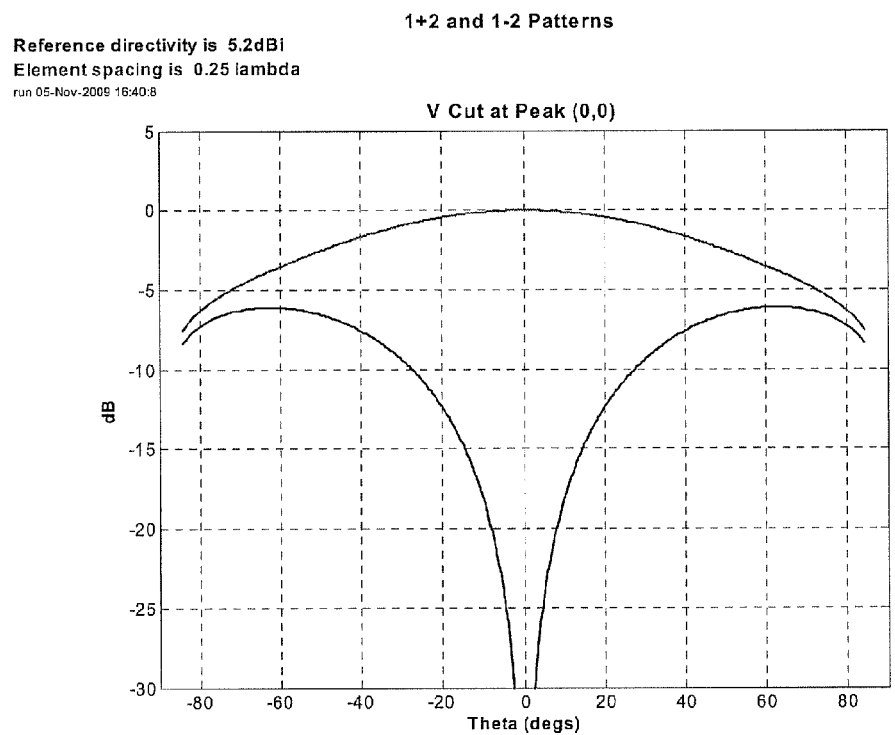
FIG. 20 illustrates simulated sum and difference antenna patterns related to the antenna array of FIG. 19.

FIG. 19 is an illustration of a seventh particular embodiment of an antenna array 1900 of a portable RFID reader having spacing of about 0.25 wavelengths center to center of antenna elements 1901 and 1902. FIG. 20 illustrates simulated sum and difference signals related to the antenna array 1900 of FIG. 19 and illustrates that at one fourth wavelength spacing of the antenna elements 1901 and 1902 the antenna array 1900 still has good sensitivity and angle selection.

Figure 21:
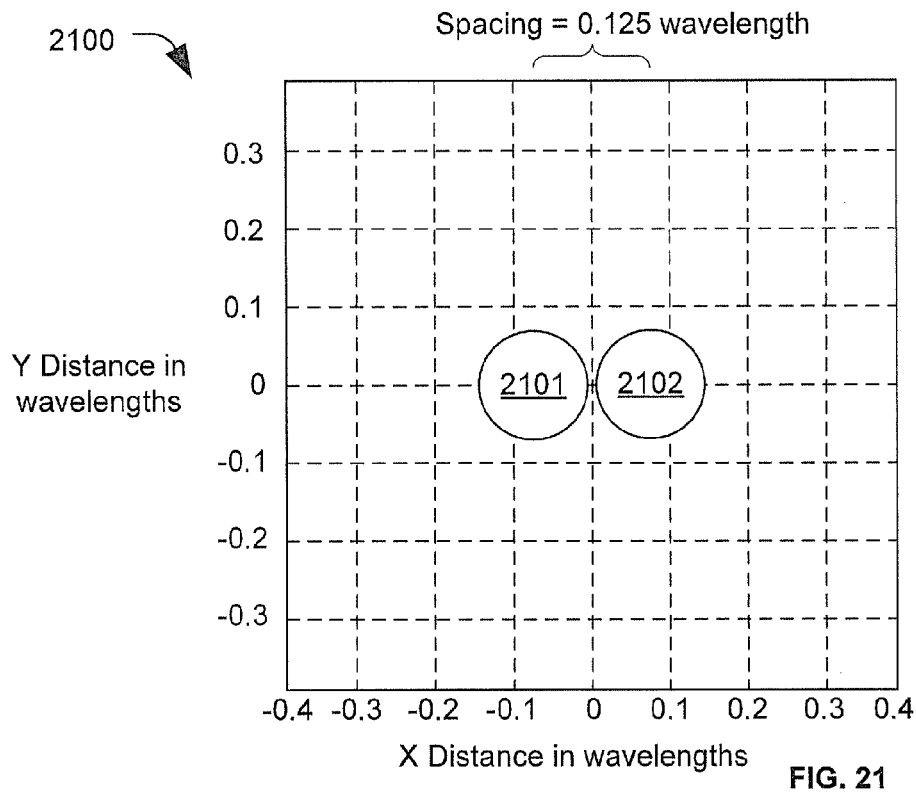
FIG. 21 is an illustration of a eighth particular embodiment of an antenna array of a portable RFID reader.
Figure 22:
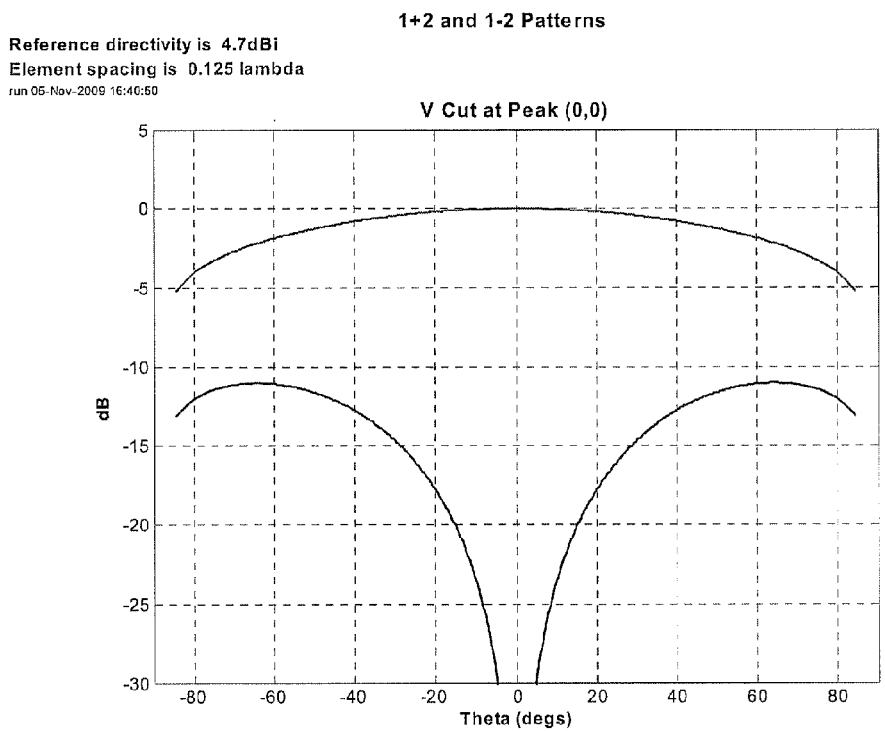
FIG. 22 illustrates simulated sum and difference antenna patterns related to the antenna array of FIG. 21.

FIG. 21 is an illustration of a eighth particular embodiment of an antenna array 2100 of a portable RFID reader having spacing of about 0.125 wavelengths center to center of antenna elements 2101 and 2102. FIG. 22 illustrates simulated sum and difference signals related to the antenna array 2100 of FIG. 21 and illustrates that at one eighth wavelength spacing of the antenna elements 2101 and 2102 the antenna array 2100 still has good sensitivity and angle selection.

Figure 23:
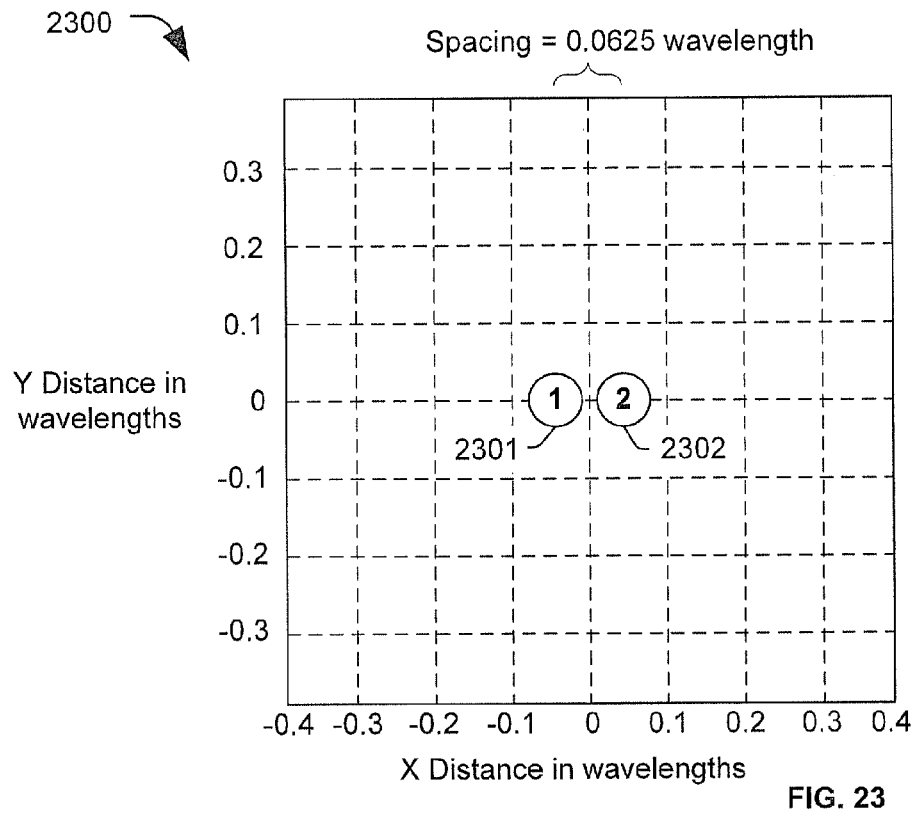
FIG. 23 is an illustration of a ninth particular embodiment of an antenna array of a portable RFID reader.
Figure 24:
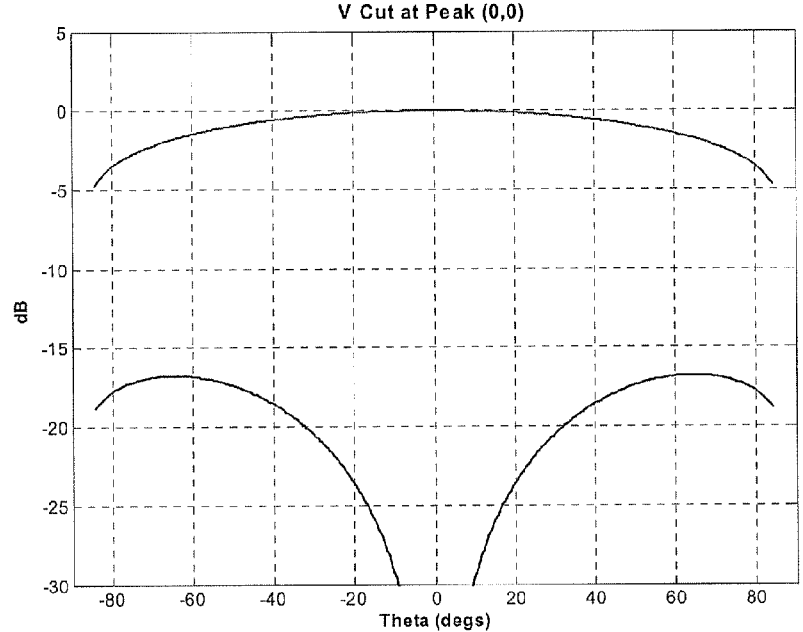
FIG. 24 illustrates simulated sum and difference antenna patterns related to the antenna array of FIG. 23.

FIG. 23 is an illustration of a ninth particular embodiment of an antenna array 2300 of a portable RFID reader having spacing of about 0.0625 wavelengths center to center of antenna elements 2301 and 2302. FIG. 24 illustrates simulated sum and difference signals related to the antenna array 2300 of FIG. 23 and illustrates that at one sixteenth wavelength spacing of the antenna elements 2301 and 2302 the antenna array 2300 has useful sensitivity and angle selection. Note that although FIGS. 17-24 deal with two antenna element arrays, sensitivity and angle selection may be further improved by addition of more antenna elements. For example, a four antenna element array having center-to-center spacing of one sixteenth wavelength between adjacent antenna elements should have improved performance relative to the two element antenna array 2300 of FIG. 23 while maintaining very small overall dimensions of the antenna array. For example, when the characteristic wavelength is about 12.9 inches, one sixteenth center-to-center spacing is less than one inch. Thus, a four element antenna array in a square configuration with one sixteenth center-to-center spacing may cover an area of about 1 square inch.

Figure 25:
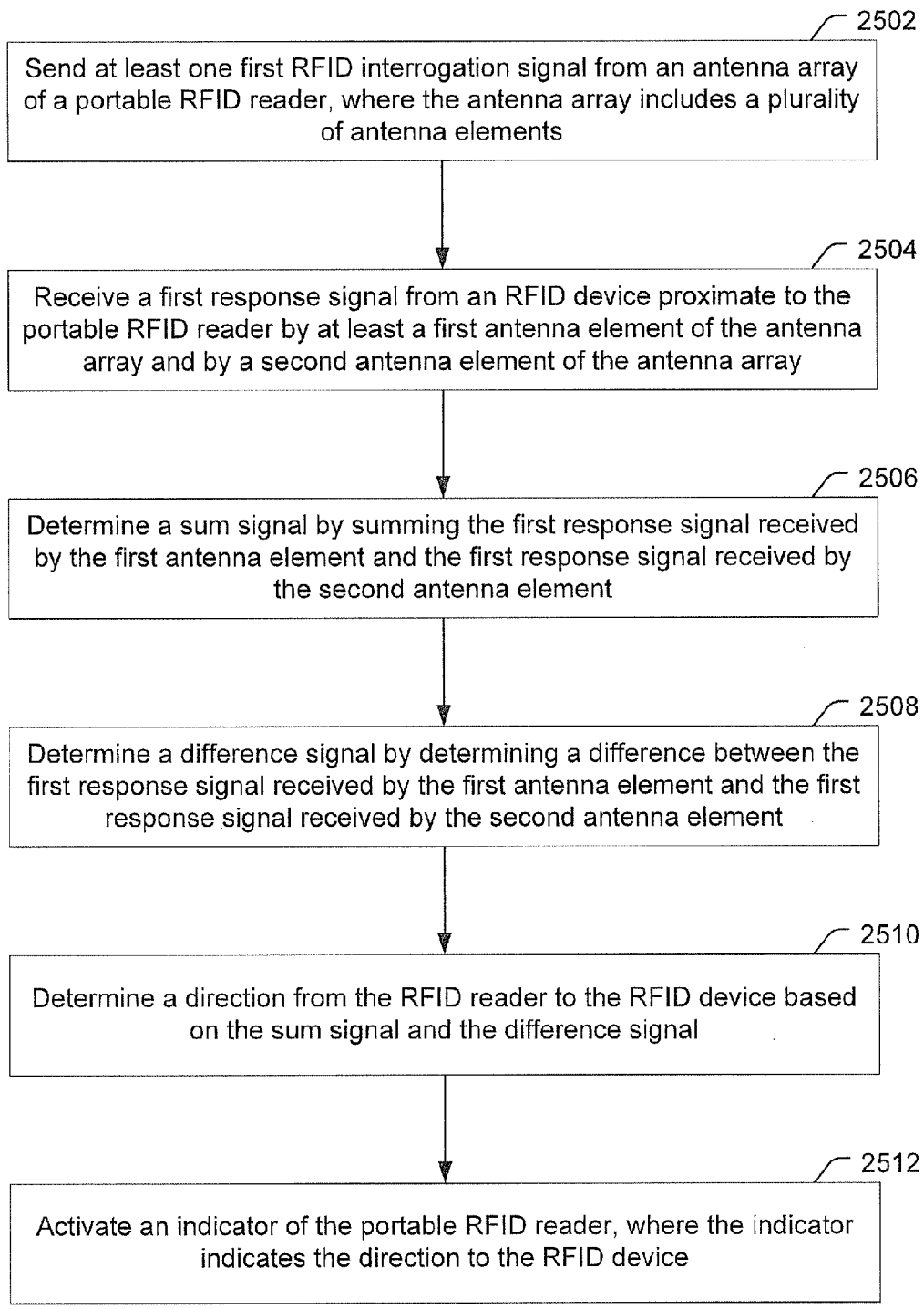
FIG. 25 is a flow chart of a first particular embodiment of a method of using a portable RFID reader.

FIG. 25 is a flow chart of a first particular embodiment of a method of using a portable RFID reader. The method includes using a portable RFID reader that sends at least one first RFID interrogation signal from an antenna array of the portable RFID reader, at 2502. An interrogation signal in this context may include a signal that requests information from an RFID device and that does not rewrite or reprogram the RFID device. The antenna array at the portable RFID reader includes a plurality of antenna elements. For example, the portable RFID reader may include the portable RFID reader 102 illustrated in FIG. 1. The antenna array may include any number or configuration of antenna array elements so long as the portable RFID reader is small enough for portable, hand-held operation. For example, the antenna array may include antenna elements as described with reference to FIG. 2, 6, 8, 12, 14, 17, 19, 21, or 23 and circuitry as described with reference to FIG. 3, 7, 9, or 13.

A first response signal may be received from an RFID device that is proximate to the portable RFID reader, at 2504. The first response signal may be received by at least a first antenna element of the antenna array and by a second antenna element of the antenna array. The method also includes, at 2506, determining a sum signal by summing the first response signal received by the first antenna element and the first response received by the second antenna element. The method further includes, at 2508, determining a difference signal by determining a difference between the first response signal received by the first antenna element and the first response signal received by the second antenna element. The method also includes, at 2510, determining a direction from the portable RFID reader to the RFID device based on the sum signal and the difference signal. The method may also include at, 2512, activating an indicator of the portable RFID reader. The indicator may indicate the direction to the RFID device.

Figure 26:
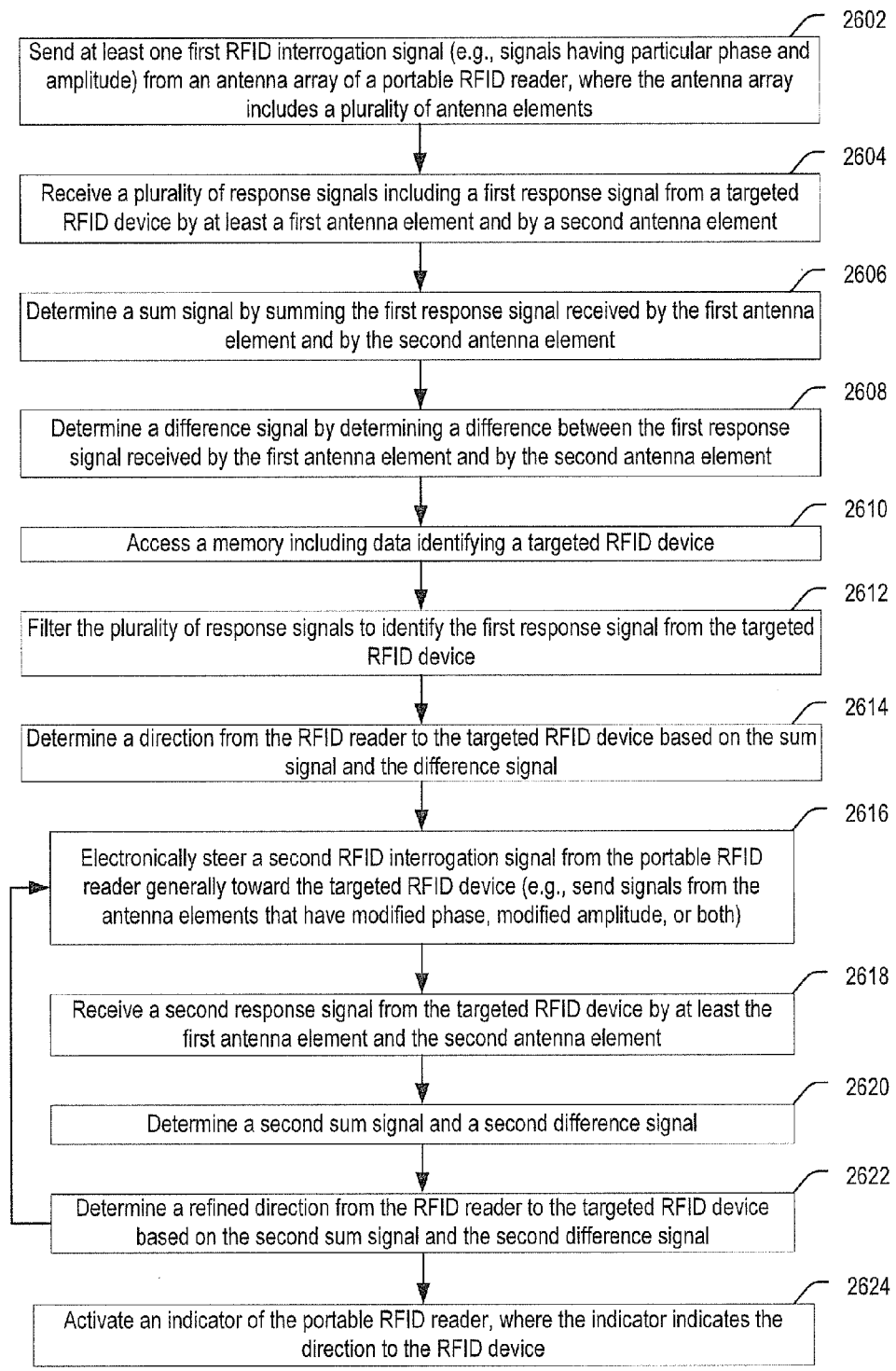
FIG. 26 is a flow chart of a second particular embodiment of a method of using a portable RFID reader.

FIG. 26 is a flow chart of a second particular embodiment of a method of using a portable RFID reader. The method includes, at 2602, sending at least one first RFID interrogation signal from an antenna array of a portable RFID reader. The portable RFID reader may include an RFID reader as described with reference to FIGS. 1-24. The portable RFID reader may include an active antenna array that includes a plurality of antenna elements. The first RFID interrogation signal may be sent via signals from antenna elements of the active antenna array that each have a particular phase and amplitude such as the first interrogation patterns 142 described with reference to FIG. 1.

The method also includes, at 2604, receiving a plurality of response signals from a targeted RFID device and one or more other RFID devices that are located proximate to the RFID reader. The response signals may be received by at least a first antenna element and a second antenna element of the active antenna array. The method also includes, at 2606, determining a sum signal by summing the first response signal received by the first antenna element and the first response signal received by the second antenna element. Additional sum signals may be determined based on signals received by other antenna elements. For example, when more than two antenna elements are present, two or more of the antenna elements may be grouped into sub-arrays that are treated as individual elements for purposes of determining sum and difference signals to determine a direction to the targeted RFID device. The method may also include, at 2608, determining a difference signal by determining a difference between the first response signal received by the first antenna element and the first response signal received by the second antenna element. As with the sum signals, difference signal may be determined based on sub-arrays of the active antenna array when more than two antenna elements are present.

The method may also include, at 2610, accessing a memory of the portable RFID reader that includes data identifying the targeted RFID device. The method may also include at, 2612, filtering the plurality of response signals received by the portable RFID reader to identify the first response signal received from the first RFID device. For example, response signals received from RFID devices other than the targeted RFID device may be discarded by the filtering. The method may also include, at 2614, determining a direction from the portable RFID reader to the targeted RFID device based on the sum signal and the difference signal.

The method may also include, at 2616, electronically steering a second RFID interrogation signal from the portable RFID reader generally toward the target RFID device. For example, the second RFID interrogation signal may be sent via a second beam pattern from the active antenna array of the portable RFID reader. The second beam pattern may be electronically steered using adaptive beam forming. For example, the second beam pattern may include the second interrogation pattern 143 of FIG. 1. To illustrate, signals sent from one or more of the antenna elements to form the second beam pattern may have a modified phase, modified amplitude or both relative to the phase and amplitude of the signals of the first RFID interrogation pattern. Additionally, or in the alternative, the method may include tuning angle discrimination of the active antenna array using the modified phase, the modified amplitude or both.

The method may also include, at 2618, receiving a second response signal from the targeted RFID device and potentially one or more other RFID devices by the active antenna array. For example, the second response signal may be received by at least the first antenna element and the second antenna element of the antenna array. The method may also include, at 2620, determining a second sum signal and a second difference signal. For example, the second sum signal may be determined by summing the second response signal received by the first antenna element and the second response signal received by the second antenna element. The second difference signal may be determined by determining a difference between the second response signal received by the first antenna element and the second response signal received by the second antenna element. As previously explained, when more than two antenna elements are present, antenna elements may be grouped into sub-arrays for purposes to determining sum signals and difference signals.

The method may also include, at 2622, determining a refined direction from the portable RFID reader to the targeted RFID device based on the second sum signal and the second difference signal. In a particular embodiment, the method returns to 2616 to iteratively electronically steer subsequent RFID interrogation signals from the portable RFID reader generally toward the targeted RFID device to determine subsequently more refined directions from the portable RFID reader to the targeted RFID device.

The method may further include, at 2624, activating an indicator of the portable RFID reader. The indicator may indicate a direction to the targeted RFID device. For example, the indicator may indicate an azimuth angle, an elevation angle, or both, from the portable RFID reader to the targeted RFID device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive. Additionally, for simplicity and clarity of illustration, certain elements illustrated in the drawings have not necessarily been drawn to scale. For example, the dimensions of some of the elements may be exaggerated relative to other elements.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A portable radio frequency identification (RFID) reader, comprising:
    an antenna array including a plurality of antenna elements to receive one or more RFID signals from each of a plurality of RFID devices, wherein each of the plurality of antenna elements include control circuitry to control a beam pattern generated by the antenna array;
    sum circuitry operable to determine a sum signal based on a sum of the one or more RFID signals received from each of the plurality of RFID devices by at least two of the plurality of antenna elements;

difference circuitry operable to determine a difference signal based on a difference of the one or more RFID signals received from each of the plurality of RFID devices by at least two of the plurality of antenna elements; and a controller to:
electronically steer the beam pattern in a direction of a particular RFID device of the plurality of RFID devices using the control circuitry of the plurality of antenna elements; and
determine the direction of the particular RFID device of the plurality of RFID devices to steer the beam pattern based on the sum signal and the difference signal.

2. The portable RFID reader of claim 1, wherein the one or more RFID signals received have a characteristic wavelength, wherein the plurality of antenna elements are separated by a center-to-center distance of less than one half the characteristic wavelength.

3. The portable RFID reader of claim 2, wherein the center-to-center distance is less than one eighth of the characteristic wavelength.

4. The portable RFID reader of claim 1, further comprising a direction indicator to indicate the direction to the particular RFID device.

5. The portable RFID reader of claim 1, further comprising a housing, wherein the sum circuitry, the difference circuitry, the controller and a battery are at least partially housed within the housing.

6. The portable RFID reader of claim 1, wherein the controller determines the direction from the portable RFID reader to the particular RFID device based at least in part on a phase of the difference signal.

7. The portable RFID reader of claim 1, wherein the plurality of antenna elements are arranged in a linear configuration.

8. The portable RFID reader of claim 1, wherein the plurality of antenna elements are arranged in a nonlinear configuration.

9. The portable RFID reader of claim 1, wherein at least one of a phase of a waveform radiated by each of at least two antenna elements of the plurality of antenna elements and an amplitude of the waveform radiated by each of the at least two of the antenna elements.

10. The portable RFID reader of claim 1, further comprising:
an input device to receive at least one RFID device identifier indicating a target RFID device; and
a memory to store the at least one RFID device identifier, wherein the controller determines the direction to the particular RFID device when an RFID device identifier of the particular RFID device is stored in the memory.

11. A portable radio frequency identification (RFID) reader, comprising:
an antenna array including a plurality of antenna elements to receive one or more RFID signals from each of a plurality of RFID devices, the one or more received RFID signals having a characteristic wavelength, wherein the plurality of antenna elements include at least a first antenna element and a second antenna element, wherein the first antenna element and the second antenna element are spaced apart at a distance of less than one half of the characteristic wavelength;
sum circuitry coupled to the first antenna element and to the second antenna element to determine a sum signal based on a sum of an RFID signal received from each of the plurality of RFID devices by the first antenna element and the second antenna element;
difference circuitry coupled to the first antenna element and to the second antenna element to deter mine a difference signal based on a difference of an RFID signal received from each of the plurality of RFID devices by the first antenna element and the second antenna element; and
circuitry to:
electronically steer a beam pattern in a direction of a particular RFID device of the plurality of RFID devices; and
determine the direction of the particular RFID device of the plurality of RFID devices to steer the beam pattern based on the sum signal and the difference signal.

12. The portable RFID reader of claim 11, wherein the active antenna array includes at least one third antenna element that is located in between the first antenna element and the second antenna element.

13. A method comprising:
sending at least one first radio frequency identification (RFID) interrogation signal to each of a plurality of RFID devices via an antenna array of a portable RFID reader, wherein the antenna array includes a plurality of antenna elements;
receiving a first plurality of response signals by at least a first antenna element of the antenna array and a second antenna element of the antenna array, wherein each of the first plurality of response signals is received from one of the plurality of RFID devices;
determining a sum signal based on a sum of the first plurality of response signals received from the plurality of RFID devices;
determining a difference signal based on a difference of the first plurality of response signals received from the plurality of RFID devices;
determining a direction from the portable RFID reader to a targeted RFID device of the plurality of RFID devices based on the sum signal and the difference signal; and
activating an indicator of the portable RFID reader, wherein the indicator indicates the direction to the targeted RFID device.

14. The method of claim 13, further comprising electronically steering at least one second RFID interrogation signal from the portable RFID reader generally toward the targeted RFID device.

15. The method of claim 14, wherein the antenna array sends the at least one first RFID interrogation signal by transmitting a first waveform having a phase and an amplitude from at least one antenna element of the plurality of antenna elements, and wherein electronically steering the at least one second RFID interrogation signal includes sending a second waveform from the at least one antenna element, the second waveform having at least one of a modified phase relative to the first waveform and a modified amplitude relative to the first waveform.

16. The method of claim 14, further comprising:
receiving a second plurality of response signals by at least the first antenna element of the antenna array and the second antenna element of the antenna array, wherein each of the second plurality of response signals is received from one of a second plurality of RFID devices;
determining a second sum signal based on a sum of the second plurality of response signals received from the second plurality of RFID devices;
determining a second difference signal based on a difference of the second plurality of response signals received the second plurality of RFID devices; and determining a refined direction from the portable RFID reader to a targeted RFID device based on the second sum signal and the second difference signal.

17. The method of claim 13, wherein the plurality of response signals received have a characteristic wavelength, and wherein the plurality of antenna elements are separated by a center-to-center distance of less than one half the characteristic wavelength.

18. The method of claim 13, further comprising filtering the first plurality of response signals based on the data identifying the targeted RFID device.

* * * * *